(12) United States Patent
Bauer et al.

(10) Patent No.: US 9,806,568 B2
(45) Date of Patent: Oct. 31, 2017

(54) STATOR/ROTOR LAMINATION SHEET FOR STATOR/ROTOR LAMINATIONS OF GENERATORS AND ELECTRIC MOTORS, STATOR/ROTOR LAMINATION WITH SUCH A STATOR/ROTOR LAMINATION SHEET AS WELL AS METHOD FOR MANUFACTURING A STATOR/ROTOR LAMINATION SHEET

(71) Applicant: Kienle + Spiess GmbH, Sachsenheim (DE)

(72) Inventors: Steffen Bauer, Zaberfeld (DE); Susanne Dutt, Wiernsheim (DE)

(73) Assignee: Kienle + Spiess GmbH, Sachsenheim (DE)

( * ) Notice: Subject to any disclaimer, the term of this patent is extended or adjusted under 35 U.S.C. 154(b) by 607 days.

(21) Appl. No.: 14/276,037

(22) Filed: May 13, 2014

(65) Prior Publication Data

US 2014/0368065 A1 Dec. 18, 2014

(30) Foreign Application Priority Data

Jun. 13, 2013 (DE) .......... 10 2013 010 249

(51) Int. Cl.
| | |
|---|---|
| H02K 9/00 | (2006.01) |
| H02K 1/32 | (2006.01) |
| H02K 1/20 | (2006.01) |
| H02K 15/02 | (2006.01) |

(52) U.S. Cl.
CPC .......... H02K 1/20 (2013.01); H02K 1/32 (2013.01); H02K 15/024 (2013.01); Y10T 29/49009 (2015.01)

(58) Field of Classification Search
CPC .............. H02K 1/12; H02K 1/20; H02K 9/22
USPC ........................... 310/58, 59, 64, 65
See application file for complete search history.

(56) References Cited

U.S. PATENT DOCUMENTS

| 662,928 A | * | 12/1900 | Geisenhoner | ........... H02K 1/20 |
| | | | | 310/267 |
| 4,542,313 A | * | 9/1985 | Di Pietro | ................. H02K 1/20 |
| | | | | 310/65 |
| 5,869,912 A | * | 2/1999 | Andrew | ................... H02K 1/20 |
| | | | | 310/52 |

(Continued)

FOREIGN PATENT DOCUMENTS

| EP | 0 893 871 A2 | | 1/1999 |
| JP | 56006635 | | 1/1981 |
| JP | 56006635 A | * | 1/1981 |

*Primary Examiner* — Jose Gonzalez Quinones
(74) *Attorney, Agent, or Firm* — Gudrun E. Huckett

(57) ABSTRACT

A stator/rotor lamination sheet for a stator/rotor lamination of generators and electric motors has spacers, wherein the spacers are monolithic lamination sections that are bent out of a lamination sheet plane about a bending edge and create corresponding recesses in the lamination sheet, wherein the spacers transversely protrude from the lamination sheet plane. A method for manufacturing the stator/rotor lamination sheet provides that a stator/rotor lamination sheet is punched out of a metal sheet; lamination sections are partially punched out out of the metal sheet; and the partially punched-out lamination sections are bent out of a lamination sheet plane of the lamination sheet to form spacers of the lamination sheet.

13 Claims, 22 Drawing Sheets

(56) References Cited

U.S. PATENT DOCUMENTS

2003/0071525 A1\* 4/2003 Tong ..................... H02K 1/20
 310/65
2007/0085440 A1 4/2007 Jeske \* cited by examiner

STATOR/ROTOR LAMINATION SHEET FOR STATOR/ROTOR LAMINATIONS OF GENERATORS AND ELECTRIC MOTORS, STATOR/ROTOR LAMINATION WITH SUCH A STATOR/ROTOR LAMINATION SHEET AS WELL AS METHOD FOR MANUFACTURING A STATOR/ROTOR LAMINATION SHEET

BACKGROUND OF THE INVENTION

The invention pertains to a stator/rotor lamination sheet for stator/rotor laminations of generators and electric motors with spacers that transversely protrude from the lamination sheet plane and with recesses. The invention further relates to a stator/rotor lamination with such a stator/rotor lamination sheet and to a method for manufacturing a stator/rotor lamination sheet, in which the stator/rotor lamination sheet is punched out of a metal sheet with recesses and in which spacers are provided.

Stators and rotors, through the laminated cores of which ventilation channels extend transverse to their axis, are particularly used in the generators and electric motors of wind power plants and hydroelectric power plants. The air flowing through the ventilation channels absorbs and dissipates the heat generated in the laminated core. In order to produce the ventilation channels, spacers in the form of strips are welded onto the stator or rotor lamination sheets that should serve as distance pieces. Each individual strip needs to be placed into a device for this purpose. In this case, a separate device is required for different shapes of the stator and rotor lamination sheets. As soon as the strip is placed into the device, the lamination sheet is placed thereon and aligned, for example, by means of an arbor with fixing device such that the strip can be fixed in the correct position on the stator or rotor lamination sheet. The strip is arranged on radially extending teeth of the stator or rotor lamination sheet that separate grooves from one another. Each strip is fixed on the lamination sheet with several spot welds. Corresponding electrodes need to be fitted for each individual spot weld. Simultaneous spot welding cannot be carried out at several locations of the lamination sheet. This is the reason why the electrodes always need to be positioned anew for each spot weld. Depending on the length of the strip, for example, three or more spot welds may be required for connecting the strip to the corresponding lamination sheet. The manufacture of corresponding laminations is elaborate, complicated and very time-consuming.

It is also known to connect the strips to the lamination sheets by means of resistance welding.

Other known spacers in the form of strips feature at least one connecting part, by means of which they are inserted into corresponding recesses in the lamination sheet. The strips usually feature two plug-in pins that are spaced apart from one another. In this case, the corresponding lamination sheets have two openings, into which the plug-in pins of the strips are inserted. After the insertion, the strips are usually also connected to the lamination sheet by means of a welding process. The manufacture of these lamination sheets is also labor-intensive and time-consuming.

The invention is based on the objective of realizing a stator/rotor lamination sheet of the aforementioned kind, a stator/rotor lamination of the aforementioned kind, and a method of the aforementioned kind in such a way that the spacers can be produced in a simpler and time-saving fashion.

SUMMARY OF THE INVENTION

According to the invention, this objective is solved according to the invention for the aforementioned stator/rotor lamination sheet in that the spacers consist of lamination sections that are bent out of the lamination sheet plane, for the stator/rotor lamination in accordance with the invention in that the laminations sheet as described above is employed, and for the aforementioned method in accordance with the invention in that lamination sections are partially punched out of the metal sheet and in that the partially punched-out lamination sections are bent out of the lamination sheet plane in order to form the spacers.

In the inventive stator/rotor lamination sheet, the spacers are realized integrally with the lamination sheet and bent out of the lamination sheet plane. The stator/rotor lamination sheet and the spacers therefore can be jointly manufactured in one piece. The stator/rotor lamination sheets can be punched in a machine fixture and the lamination sections for forming the spacers can be bent out. Since the spacers are realized integrally with the lamination sheet, it is not necessary to additionally connect the spacers to the lamination sheet by means of welding, bonding or the like. This also affects the strength and stability of the lamination sheet provided with the spacers. The stator/rotor lamination sheets can be provided with the spacers in a simple and time-saving fashion because they merely need to be bent out of the lamination sheet by means of a bending process.

The stator and rotor lamination sheets are advantageously used within stator or rotor laminations that are utilized in wind power plant and hydroelectric power plants. The spacers make it possible to easily realize ventilation channels within the stator or rotor lamination, through which air can flow during the operation of the stators and rotors in order to carry off the generated heat. The lamination sheet provided with the spacers is advantageously manufactured of the same material as the stator or rotor lamination sheets within the stator or rotor laminations. The lamination sheet with the spacers is an electric lamination sheet and therefore an active lamination sheet analogous to the remaining lamination sheets within the laminated core. Due to the integral design, there is no risk of the spacers separating from the lamination sheet.

The spacers are advantageously arranged on the lamination sheet in a radially extending fashion. In this way, radially extending ventilation channels that ensure optimal heat dissipation are formed within the laminated core. Since the spacers are bent out of the lamination sheet, they only have a small wall thickness such that the flow cross section of the ventilation channels is large in relation to the cross-sectional area formed by the spacers when the spacers are provided over the circumference of the stator/rotor lamination sheet.

The spacers may also be arranged at an angle relative to the corresponding radial. In this context, the term corresponding radial refers to any radial extending through the spacer. Due to the angular position of the spacers, the wider contact surface than in a radial alignment of the spacers is provided for the lamination sheet lying thereon viewed in the radial direction.

In a preferred embodiment, the spacers are uniformly distributed over the circumference of the stator/rotor lamination sheet. In this way, ventilation channels that are uniformly distributed over the circumference and allow good heat dissipation are produced within the laminated core.

However, it is also possible to non-uniformly distribute the spacers over the circumference of the stator/rotor lamination sheet.

Since the spacers are bent out of the lamination sheet, a recess is respectively situated in the stator/rotor lamination sheet adjacent to the spacers. The spacers may be realized in such a way that they are always arranged on the same side of the corresponding recess, wherein this results in a symmetric bending row, in which the spacers are arranged. In this case, the spacers may either be arranged on the right edge or the left edge of the recess viewed in the circumferential direction.

In another embodiment, the spacers may also be realized in such a way that one spacer of adjacent recesses is arranged on the right edge of the recess and the other spacer is arranged on the left edge of the recess. In this way, a U-shaped arrangement of the spacers is produced because the spacers situated on the right and on the left edge of the recesses are respectively provided in pairs. In such an embodiment, one recess may be respectively provided for the two spacers. However, it would also be possible to provide only a single recess for both spacers. In this case, the lamination sections are separated from one another in the center after they were partially punched out of the lamination sheet and the lamination sections situated to the right and to the left of this separating line are bent out of the lamination sheet plane.

In a simple embodiment, the spacers are successively arranged in at least one row at a certain distance from one another. This row lies coaxial to a central opening of the stator or rotor lamination sheet.

Depending on the width of the stator/rotor lamination sheet, however, the spacers may also be arranged in two or more rows that respectively lie coaxial to the central opening of the stator/rotor lamination sheet. The rows are advantageously spaced apart from one another in the radial direction. In this case, the spacers and recesses in these rows are advantageously also spaced apart from one another in the radial direction. Due to this clearance, lamination sections that extend continuously in the circumferential direction remain between the rows and provide the stator/rotor lamination sheet with sufficient strength.

It is advantageous to respectively arrange at least a few of the spacers in the rows in alignment with one another. In this way, ventilation channels that continuously extend from the inside to the outside are produced within the stator or rotor lamination.

At least a few of the spacers may also be arranged in the rows offset to one another in the circumferential direction. The spacers may in this case be arranged in a radially extending fashion, as well as at an angle relative to the corresponding radial. In this way, the stator/rotor lamination sheet can be individually adapted to the respective application.

The spacers advantageously have the same length as the edge of the corresponding recess that forms the bending edge.

In another advantageous embodiment, however, it is also possible to realize the spacers such that they are shorter than the edge of the recess, on which they are bent up. Such a design has the advantage that the lamination sections partially punched out of the lamination sheet can be easily bent up because the edges of the spacers that lie transverse to the bending edge are spaced apart from the corresponding edges of the recess.

The spacers advantageously are perpendicularly bent out of the lamination sheet plane.

The stator or rotor lamination is characterized in that it features at least one stator or rotor lamination sheet with bent-out spacers. Depending on the height of the stator or rotor lamination, it would also be possible to provide two or more stator or rotor lamination sheets with spacers in order to produce more ventilation passages over the height of the lamination.

The stator/rotor lamination sheet with the bent-out spacers separates two laminated core sections of the respective laminated core from one another and serves for producing ventilation channels that extend through the laminated core transverse to its axis.

The inventive method is characterized in that the stator or rotor lamination sheets are conventionally punched out of a metal sheet. In addition, lamination sections are only partially punched out of the lamination sheets such that they remain connected thereto. These lamination sections are then bent out of the lamination sheet plane by means of a bending process in order to form the spacers.

The object of this application is not only defined by the subject matter of the individual claims, but also by all information and characteristics disclosed in the drawings and the description. Even if they are not subject matter of the claims, these characteristics are claimed as essential to the invention as far as they are novel in comparison with the prior art individually or in combination.

Additional characteristics of the invention result from the other claims, the description and the drawings.

BRIEF DESCRIPTION OF THE DRAWINGS

The invention is described in greater detail below with reference to embodiments illustrated in the drawings. It is shown in.

DESCRIPTION OF PREFERRED EMBODIMENTS

The invention is described below with reference to different embodiments of stator and rotor lamination sheets. The lamination sheets are used for stator and rotor lamination of generators and electric motors that are utilized, in particular, in hydroelectric power plants and wind power plants. The laminated cores are provided with ventilation channels in order to dissipate the heat generated during the operation of the machines equipped with such cores. In order to produce such ventilation channels, individual lamination sheets of the core are punched in such a way that webs can be bent out of the material of the lamination sheets and serve as spacers relative to the adjacent lamination sheet within the laminated core. The webs form the ventilation channels, through which air can be conveyed in order to carry off the heat being generated. The webs are realized integrally with the lamination sheet such that a simple manufacture can be achieved.

Figure 1:
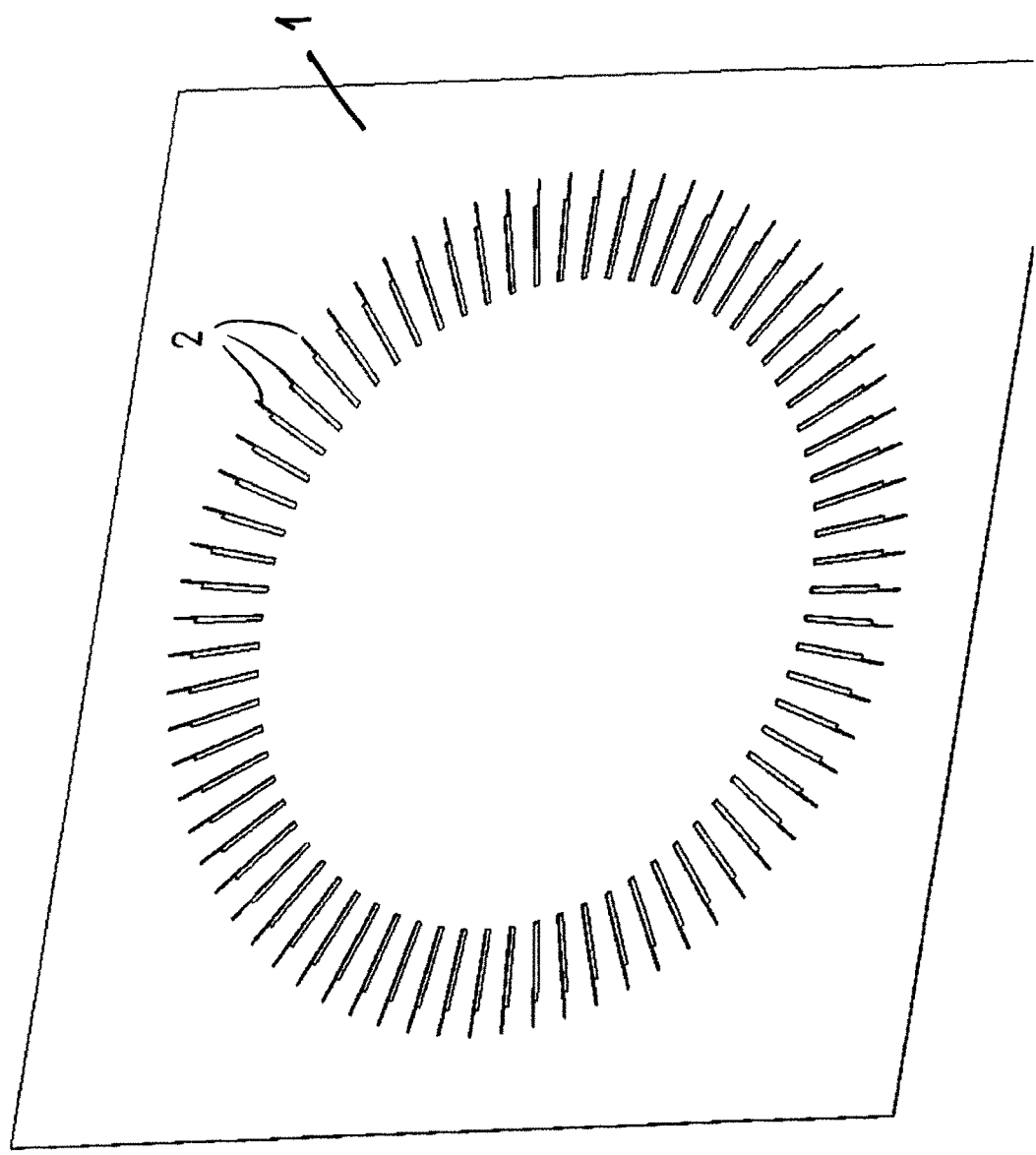
FIG. 1 a metal sheet, in which punch-cuts for the manufacture of a stator lamination sheet have been produced in a first punching step, FIG. 2 an enlarged representation of part of the metal sheet according to FIG. 1, FIG. 3 the metal sheet according to FIG. 1, in which additional punch-cuts have been produced in a second punching step, FIG. 4 an enlarged representation of part of the metal sheet according to FIG. 3, FIG. 5 a perspective representation of the metal sheet according to FIGS. 1 to 4, wherein lamination sections have been perpendicularly bent out of said metal sheet, FIG. 6 an enlarged representation of part of the metal sheet according to FIG. 5, FIG. 7 an enlarged representation of part of the metal sheet according to FIG. 5, FIG. 8 a perspective representation of an annular stator lamination sheet that has been punched out of the metal sheet according to FIG. 5, FIG. 9 enlarged representation of parts of the stator lamination sheet according to FIG. 8, FIG. 10 an enlarged representation of parts of the stator lamination sheet according to FIG. 8, FIG. 11 a perspective representation of a laminated stator core containing two stator lamination sheets according to FIG. 8 that are arranged a certain distance on top of one another and used for producing ventilation channels, FIG. 12 a perspective representation of a stator lamination sheet arranged within the laminated stator core according to FIG. 11, FIG. 13 a perspective representation of a second embodiment of an inventive stator lamination sheet, FIG. 14 an enlarged representation of different regions of the stator lamination sheet according to FIG. 13, FIG. 15 an enlarged representation of different regions of the stator lamination sheet according to FIG. 13, FIG. 16 a perspective representation of an inventive rotor lamination sheet, FIG. 17 a perspective presentation of a second embodiment of an inventive rotor lamination sheet, FIG. 18 an enlarged representation of different regions of an inventive stator lamination sheet realized in the form of a ring segment, FIG. 19 an enlarged representation of different regions of an inventive stator lamination sheet realized in the form of a ring segment, FIG. 20 a perspective representation of an inventive device for manufacturing the stator and rotor lamination sheets, FIG. 21 a schematic representation of a bending tool of the device according to FIG. 20 prior to the bending process, and FIG. 22 the bending tool according to FIG. 21 during the bending process.
Figure 2:
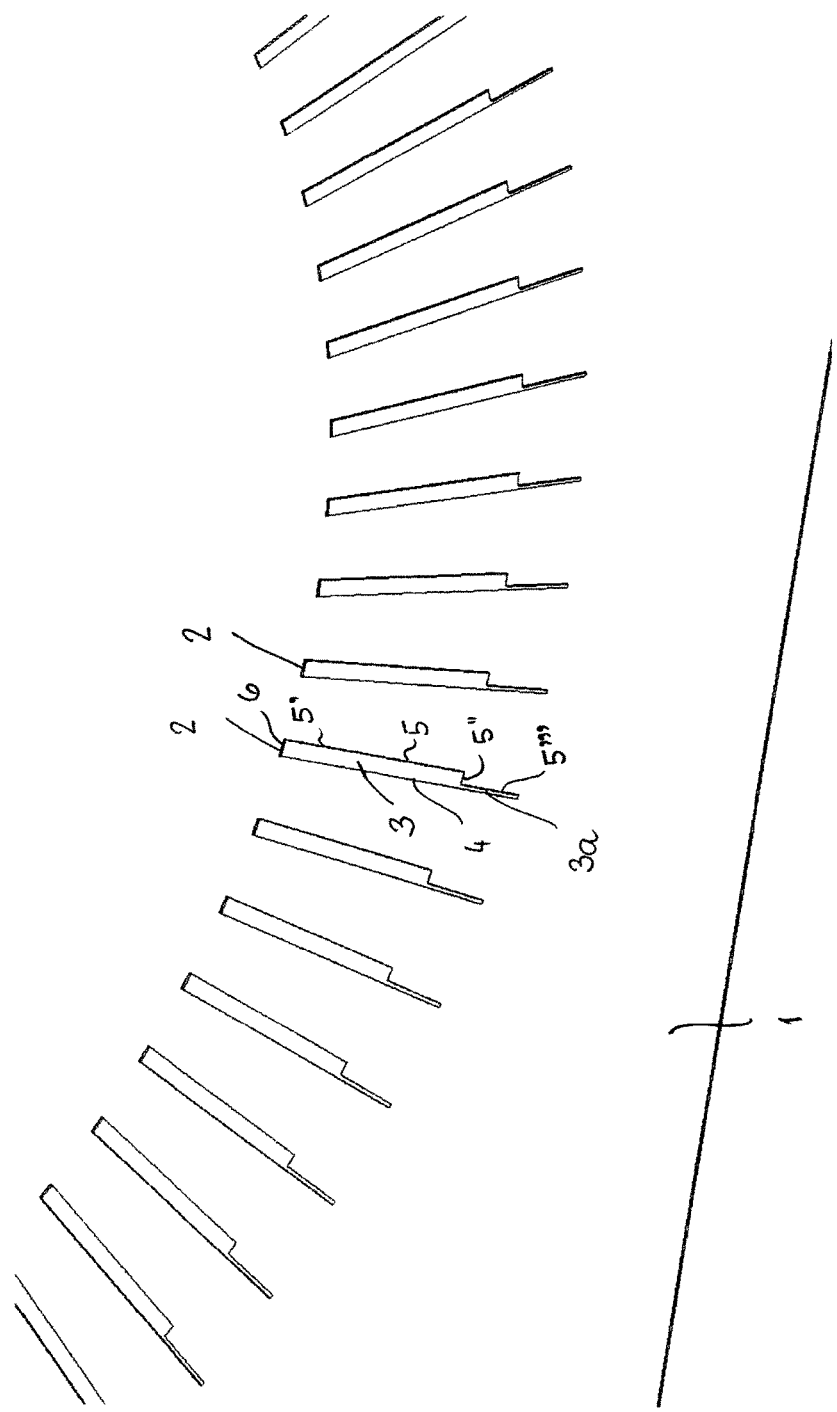

A metal sheet 1 that may be unwound from a coil or consist of a plate serves as the starting material for the stator/rotor lamination sheets. FIG. 1 shows a plate, in which radially extending cuts 2 that lie on a circle are produced in a first punching step. These cuts are uniformly distributed over the circumference of the circle and realized identical to one another. In this first punching step, radially extending rectangular recesses 3 are produced that transform into narrow and likewise radially extending recesses 3a on the radially outer end. The recesses 3, 3a have a common radially extending edge of cut 4 whereas the opposite edge of cut 5 relative to the circumferential direction is realized in a stepped fashion. It features a radially inner section 5' that originates at the radially inner end 6 of the recess 3 and transforms into a radially outer section 5''' via a rectangular step 5''. The radially outer section 5''' is spaced apart from the opposite edge of cut 4 by a significantly shorter distance than the radially inner section 5'.

Figure 3:
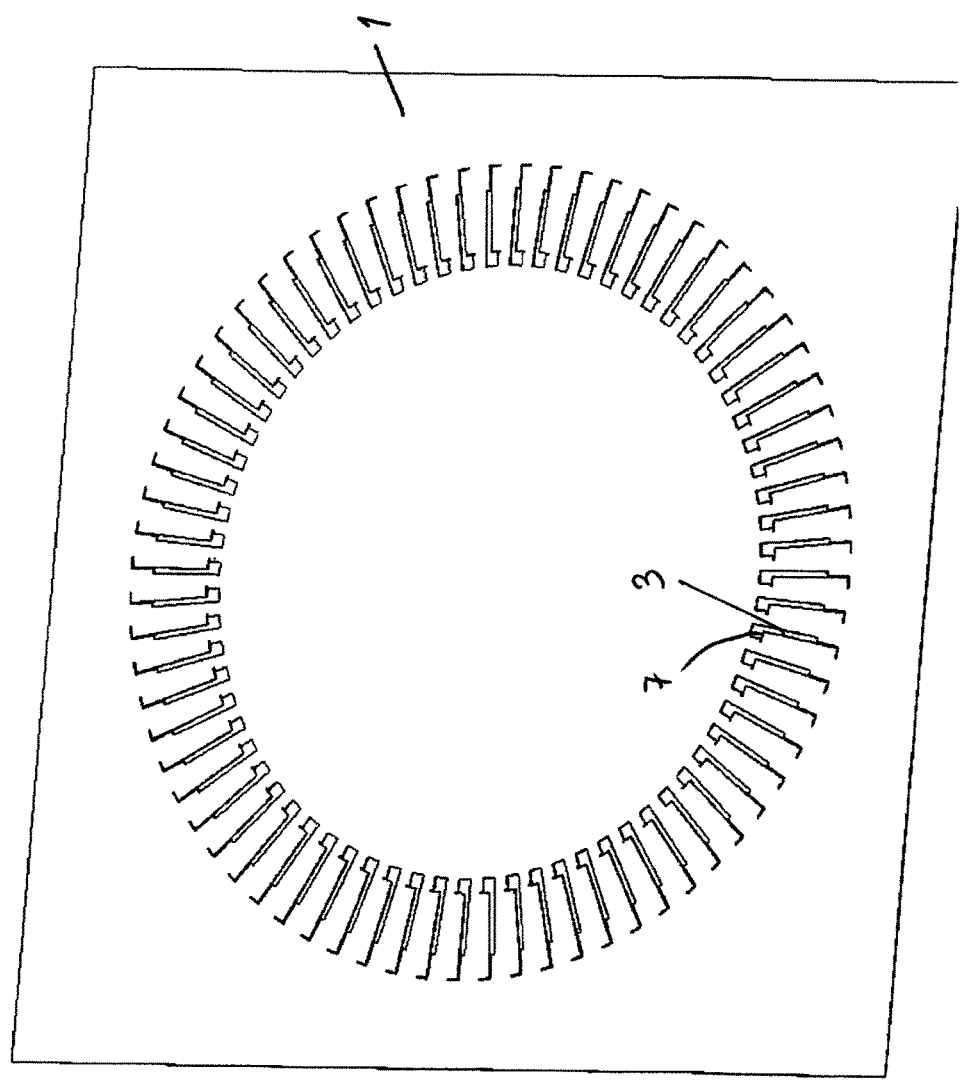
Figure 4:
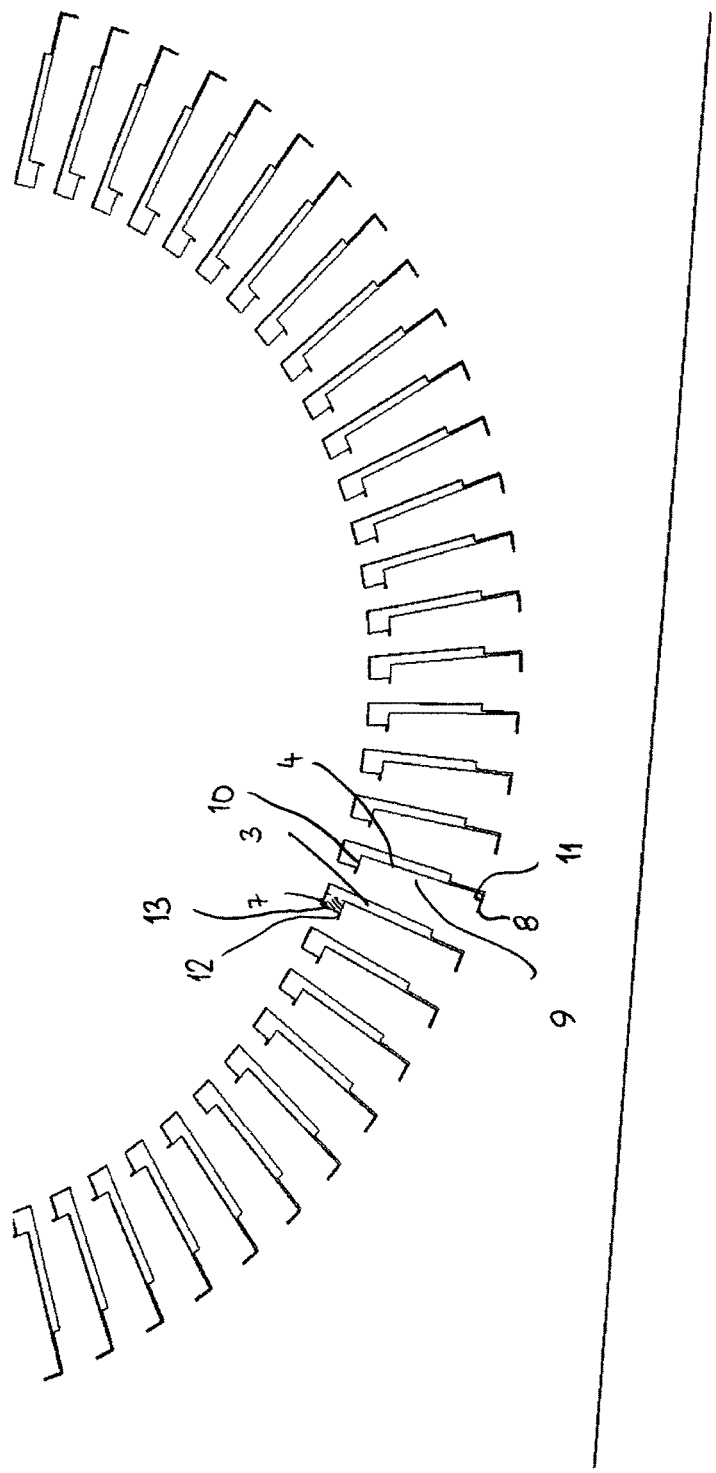

In a second punching step (FIGS. 3 and 4), the recess 3 is widened in the circumferential direction on the radially inner end by means of a corresponding punch-cut. This widened region of the recess 3 is identified by the reference symbol 7 in FIGS. 3 and 4.

A cut 8 extending in the circumferential direction is simultaneously produced on the radially outer end of the narrow recess 3a in this second punching step. Due to the widened region 7, a rectangular lamination section 9 is respectively produced, wherein one radially extending longitudinal side of this lamination section is formed by the edge of cut 4. The lamination section 9 still lies in the plane of the lamination sheet 1. It is bent out of the plane of the lamination sheet 1 in an ensuing bending step.

The radially inner narrow side 10 of the lamination section 9 defines the widened region 7. The radially outer narrow side 11 of the lamination section 9 is formed by the cut 8. In order to simplify the bending process, the cut 12 on the radially inner narrow side 10 in the second punching step is slightly extended in the circumferential direction such that it extends beyond the radial narrow side 13 of the widened region 7 of the recess 3.

Figure 5:
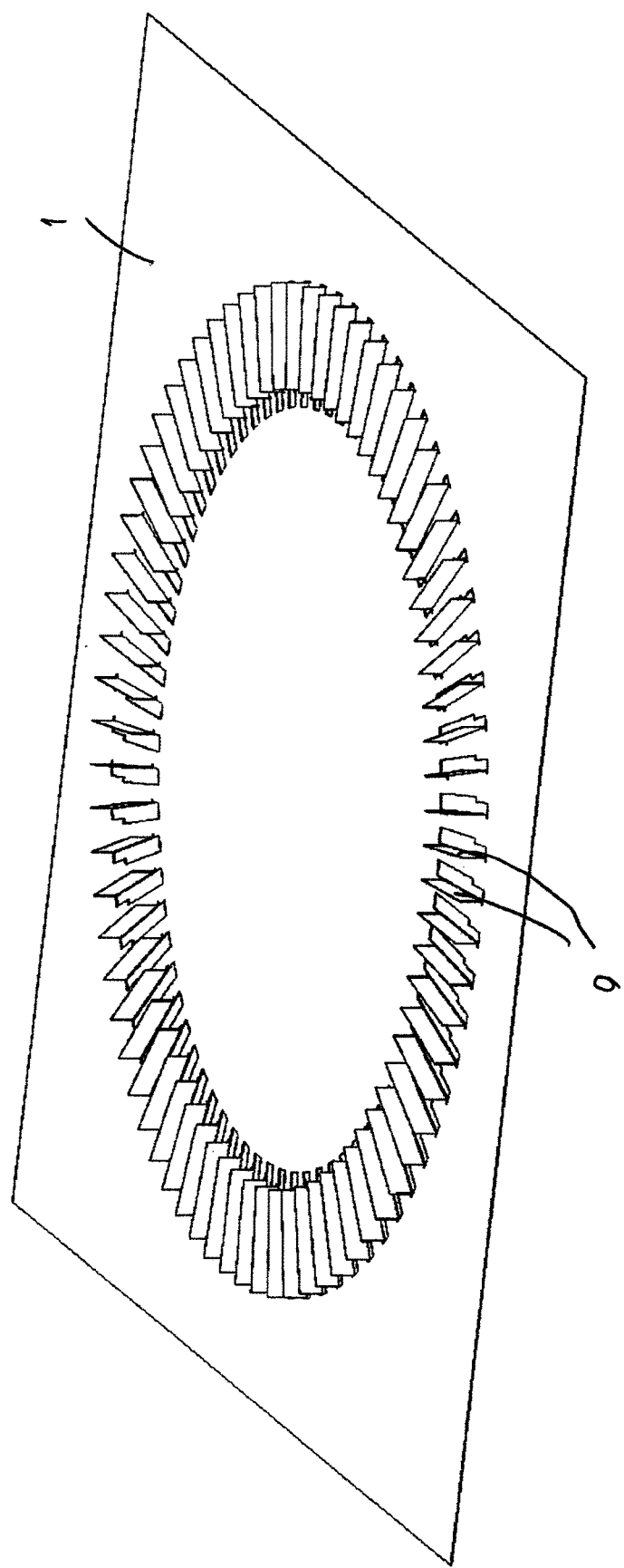
Figure 6:
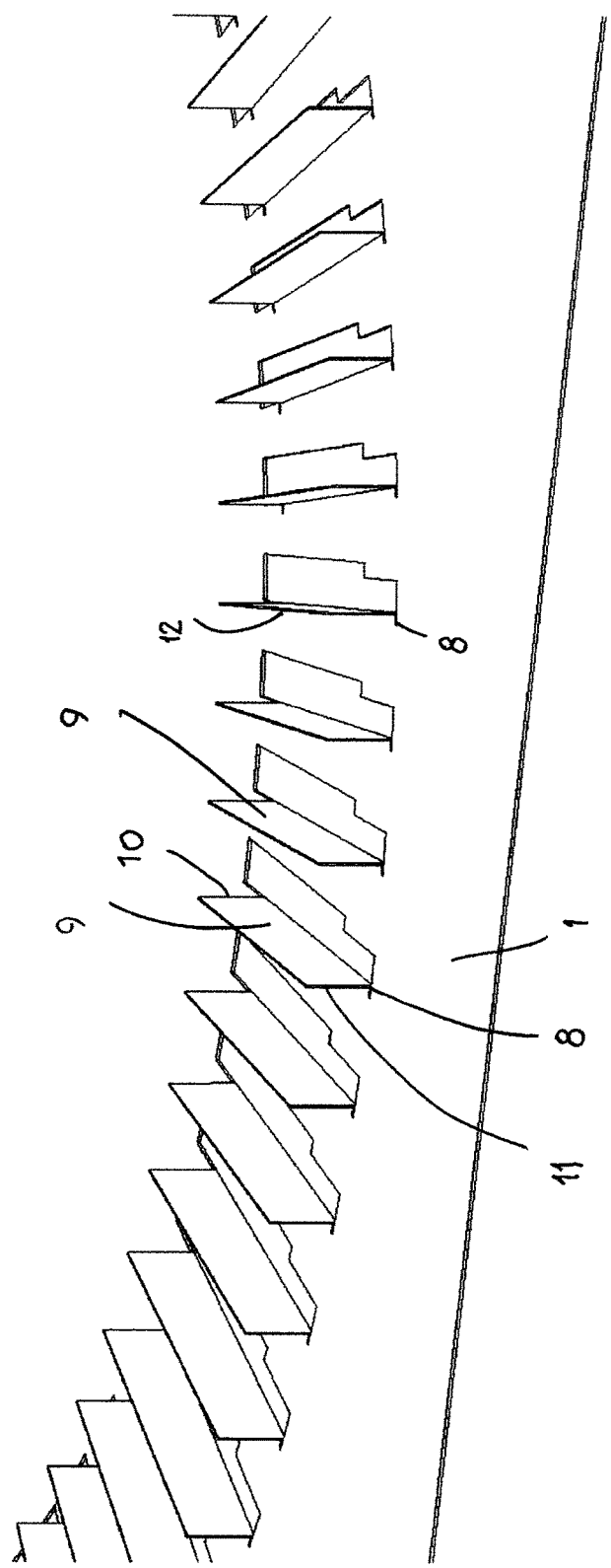
Figure 7:
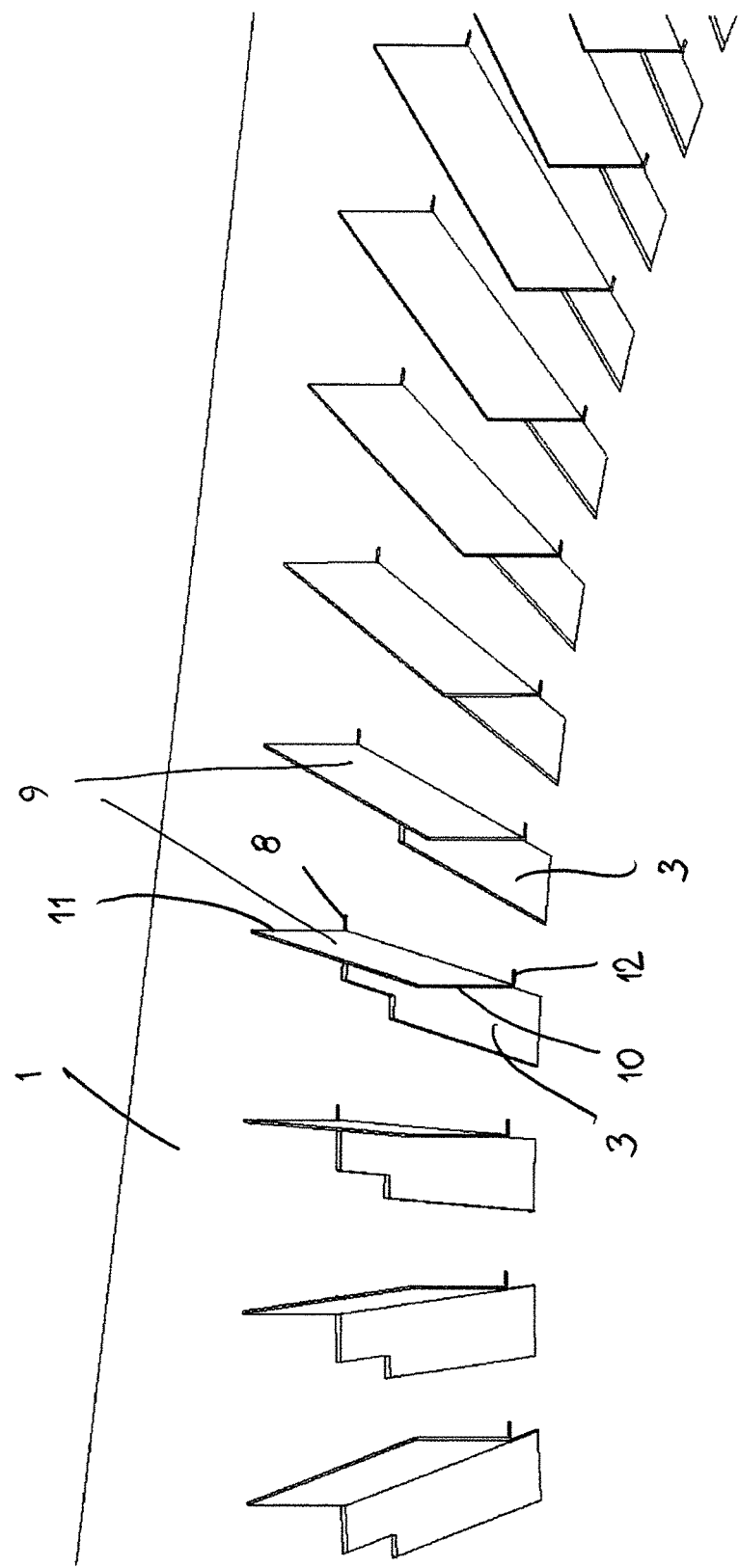

According to FIGS. 5 to 7, the lamination section 9 is perpendicularly bent out of the plane of the lamination sheet 1. The cuts 8, 12 are produced in such a way that they slightly extend beyond the bent-up lamination section 9 in the circumferential direction (FIGS. 6 and 7).

Figure 8:
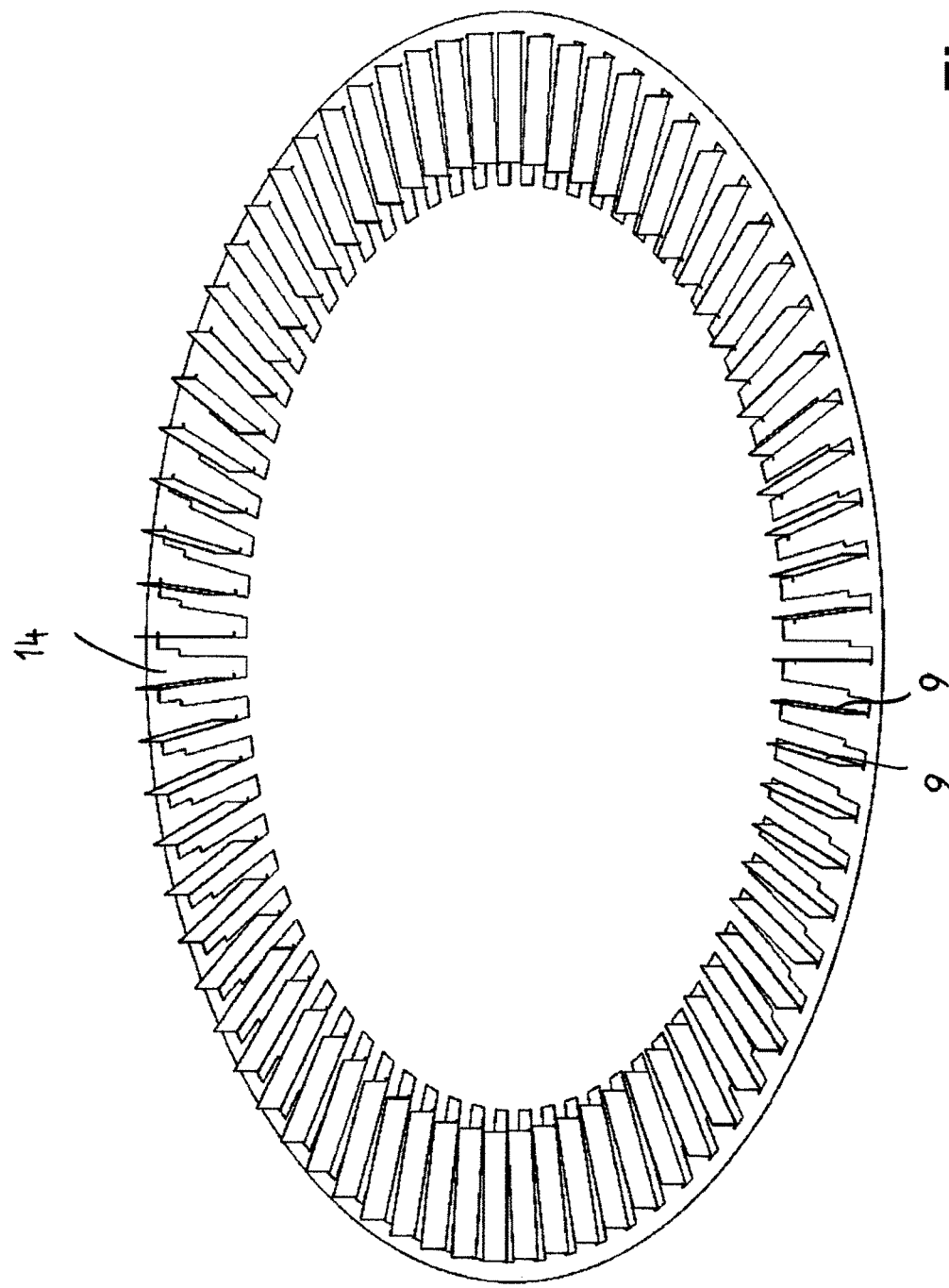
Figure 9:
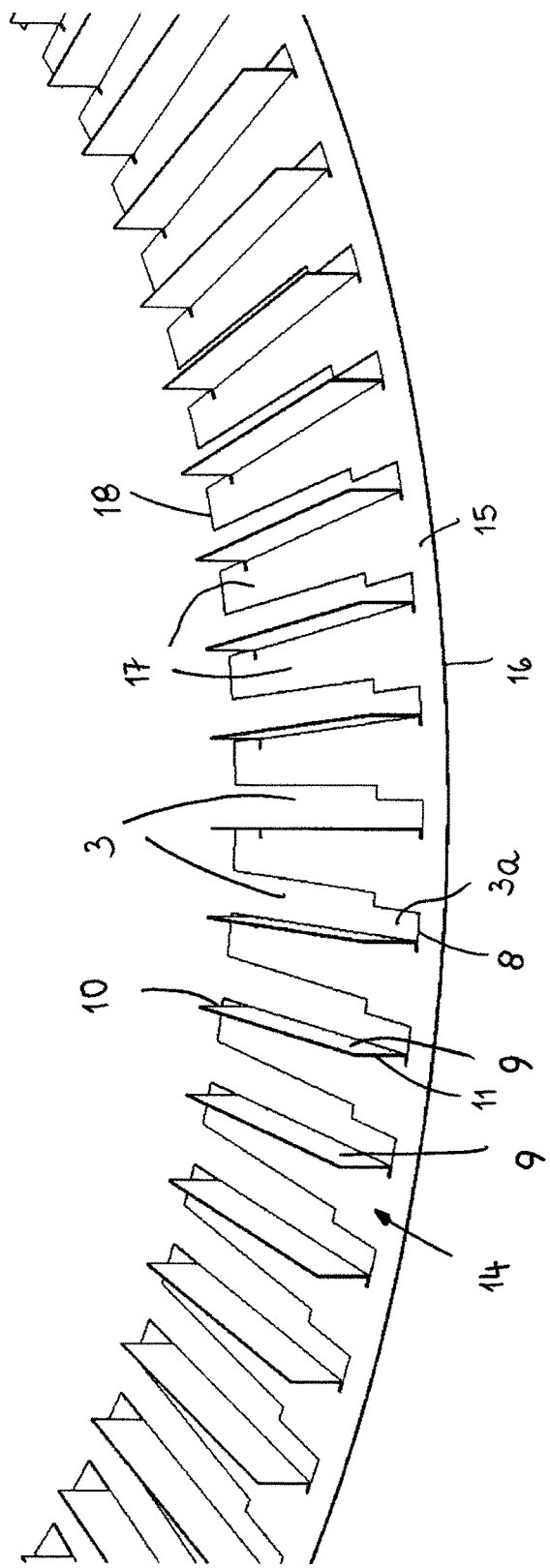
Figure 10:
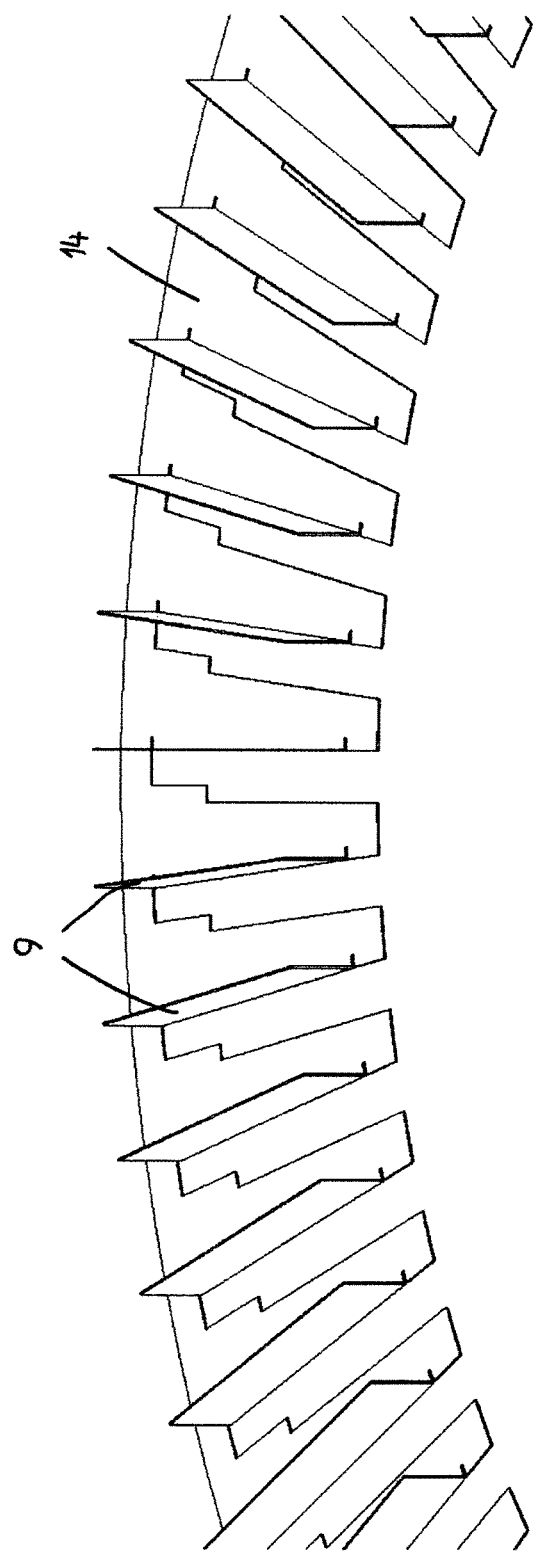

The stator lamination sheet 14 is then punched out of the metal sheet 1 in at least one ensuing punching step (FIGS. 8 to 10). The two circular punch-cuts lie coaxial to one another. The inner circular punch-cut is positioned in such a way that the recess 3 is open radially inward. The outer circular punch-cut is produced in such a way that the stator lamination sheet 14 features an outer circumferential edge section 15. The radially outer narrow side 11 of the bent-up lamination sections 9 lies a certain distance from the outer circular edge 16 of the stator lamination sheet 14. The recesses 3 are successively arranged in the circumferential direction at identical distances from one another and separated by webs 17 that lie in the lamination sheet plane. Their free front sides 18 lie on a common circle that extends coaxial to the outer edge 16. The radially inner narrow side 10 of the lamination sections 9 is radially spaced apart from the free front sides 18 of the webs 17. The bent-up lamination sections 9 are arranged on a radially extending edge of the recesses 3.

Figure 11:
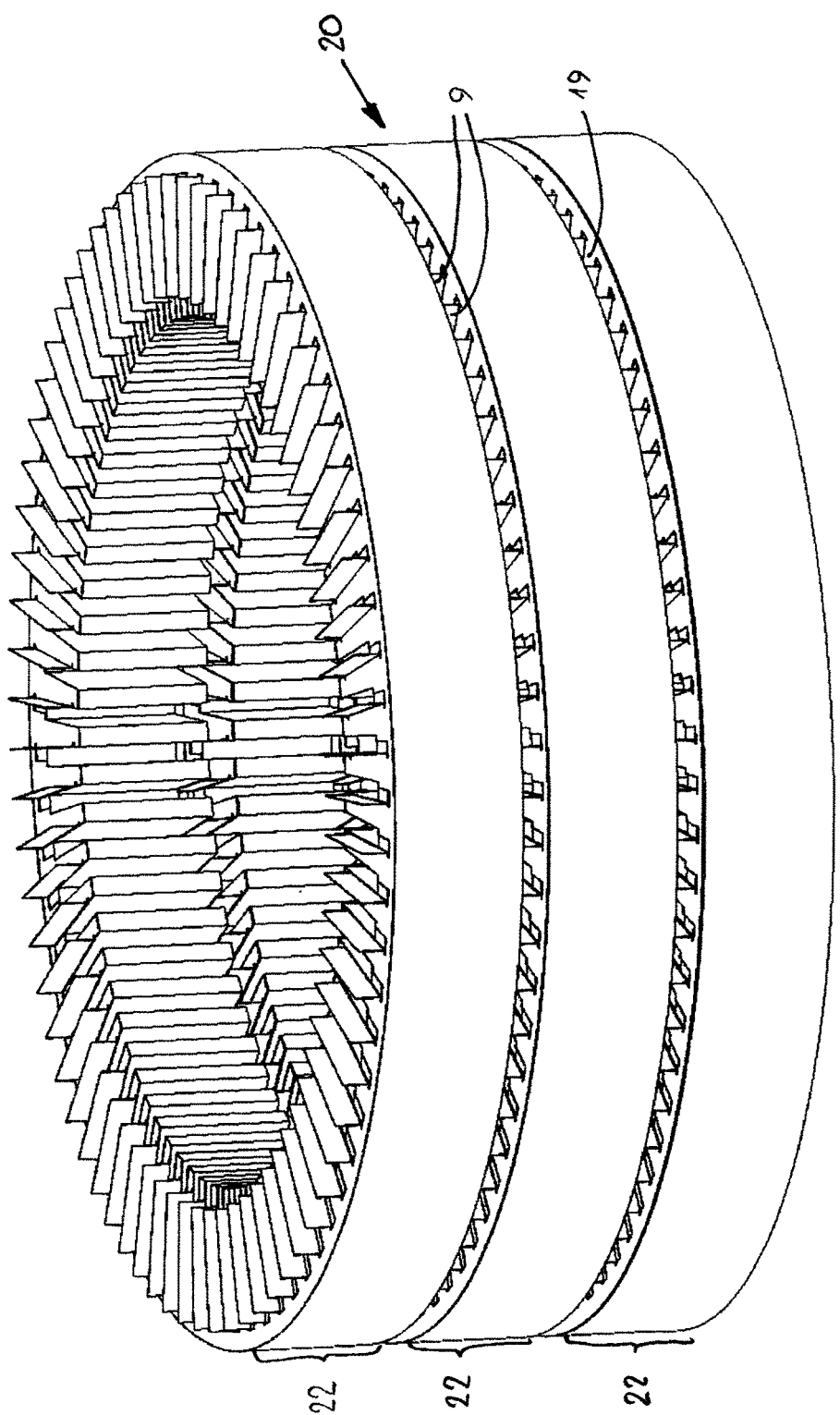

The lamination sections 9 form spacers that extend perpendicular to the lamination sheet plane and form radially extending ventilation channels 19 within the laminated core (FIG. 11). Symmetrically arranged ventilation channels 19 are produced within the respective laminated core due to the symmetric arrangement of the bent-up lamination sections 9 (FIG. 11).

FIG. 11 shows part of an exemplary laminated core 20 with ventilation channels 19 that are uniformly distributed over the circumference and lie in two planes that are arranged a certain distance on top of one another. They separate laminated core sections 22 that are conventionally connected to one another. The axial height of the ventilation channel 19 is defined by the height of the lamination sections 9. The position of the lamination sections 9 defines the course of the ventilation channels 19. In the exemplary embodiment, the lamination sections 9 respectively extend in the radial direction. The center plane of each guide channel 19 accordingly also extends radially.

Depending on the requirements and/or the installation conditions, the laminated core 20 features the number of ventilation channels 19 required for dissipating the generated heat. In the region between the ventilation channels 19, the core laminations within the laminated core sections 22 are solidly connected to one another in a conventional fashion. In this way, the core lamination sheets that lie on top of one another can be connected in a form-fitting fashion by providing the core laminations with imprints. Consequently, the core lamination sheets are provided with protruding imprints on one side and with corresponding depressions on the other side. This makes it possible to place the core lamination sheets on top of one another in such a way that the imprints engage into the depressions of the respectively adjacent core lamination sheet. In addition, the core laminations may be solidly connected to one another with the aid of screws or the like. It is also possible to solidly connect core lamination sheets that lie on top of one another, for example, by means of a bonded connection. In this case, the core lamination sheets do not have to be deformed.

The laminated cores 20 are provided with windings in a suitable fashion and usually impregnated. During the operation of the electric motors and generators equipped with the laminated cores 20, air flows through the ventilation channels 19 and during this process absorbs heat from the laminated core 20 that is subsequently emitted into the surroundings. In this way, effective cooling of the laminated core 20 is ensured during the operation. The distance between the ventilation channels 19 that lie on top of one another is chosen in such a way that the heat can be optimally dissipated over the entire circumference and over the entire height of the laminated core 20.

The laminated core 20 can be easily assembled during the installation by simply stacking the laminated core sections 22 that are subsequently connected to one another in a conventional fashion. The bent-up lamination sections 9 make it possible to easily ensure that the ventilation channels 19 of the stator and the rotor are arranged at the same height.

Figure 12:
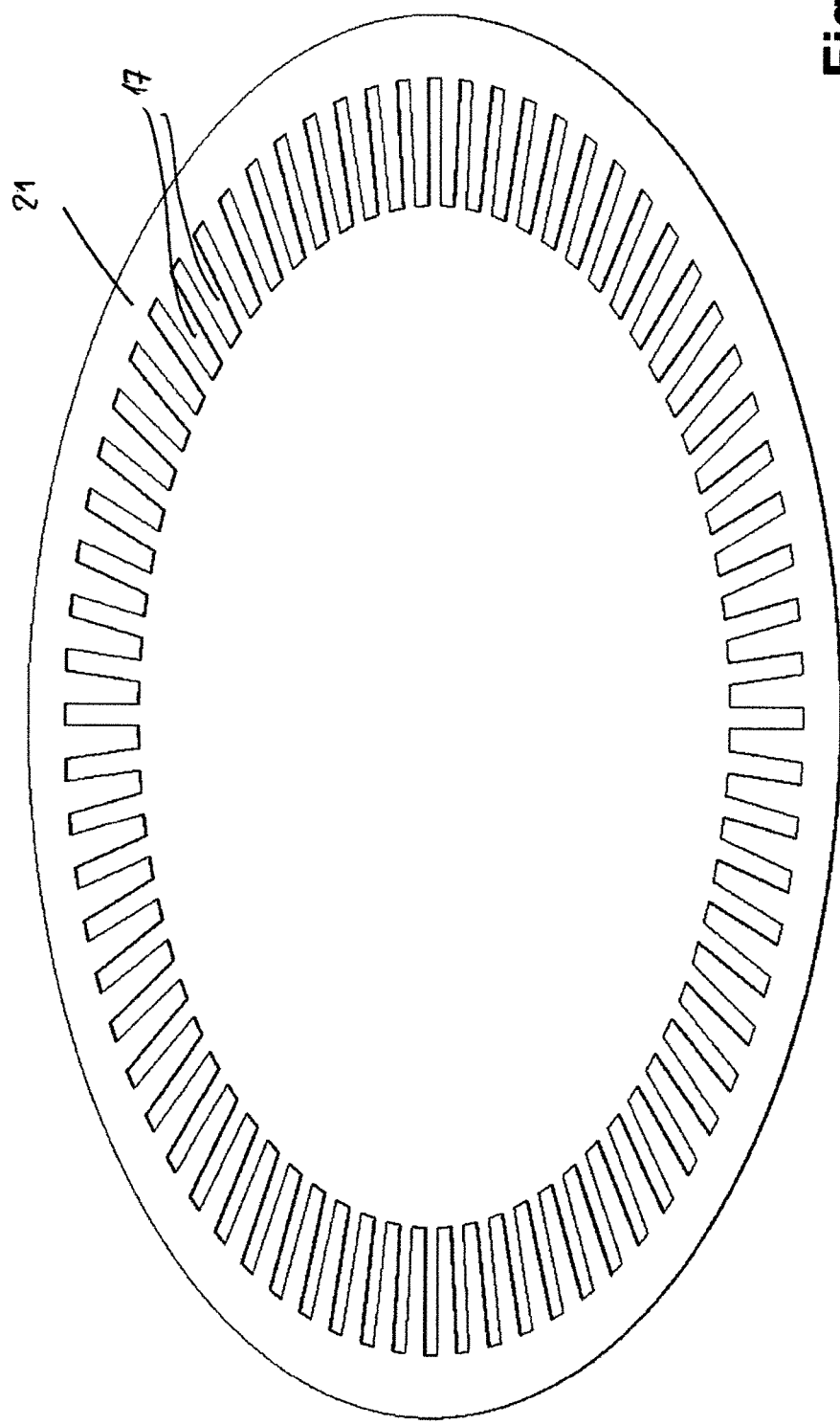

FIG. 12 shows an exemplary stator lamination sheet 21 that does not feature any upright lamination sections, but rather merely the radially extending webs 17. The individual laminated core sections 22 (FIG. 11) that lie between the ventilation channels 19 are produced with such lamination sheets 21.

Figure 13:
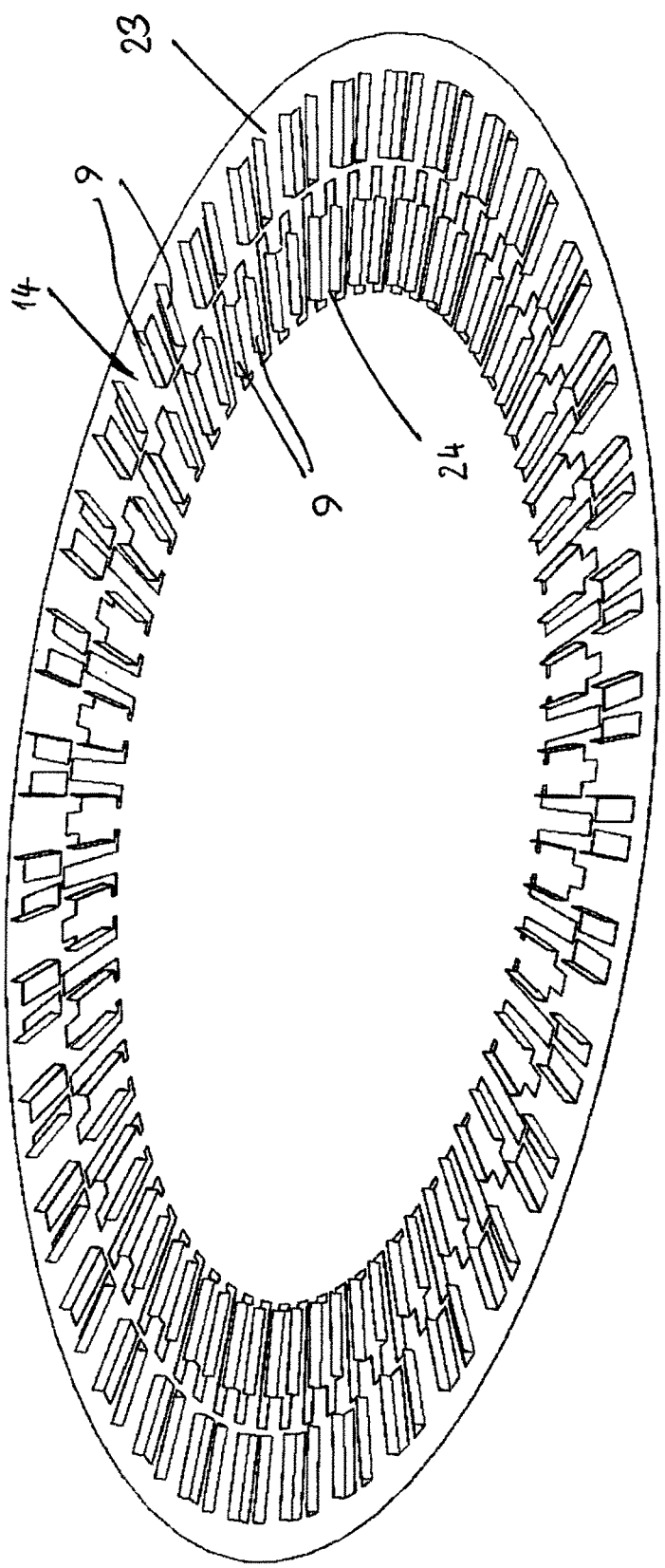
Figure 14:
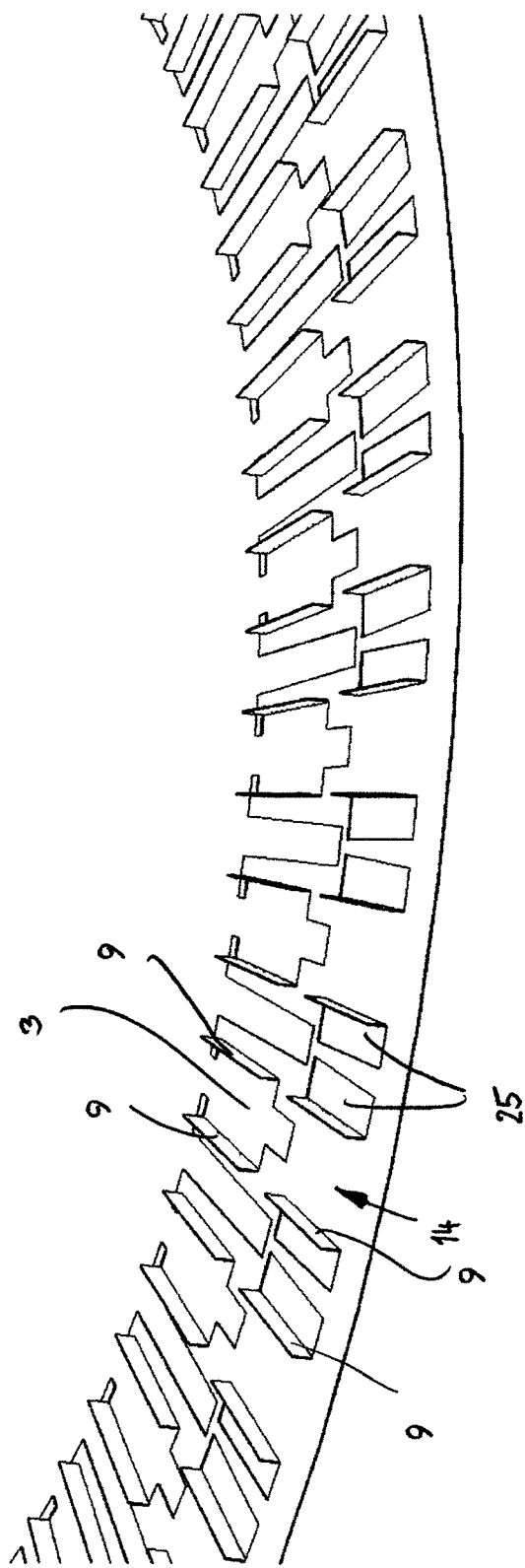
Figure 15:
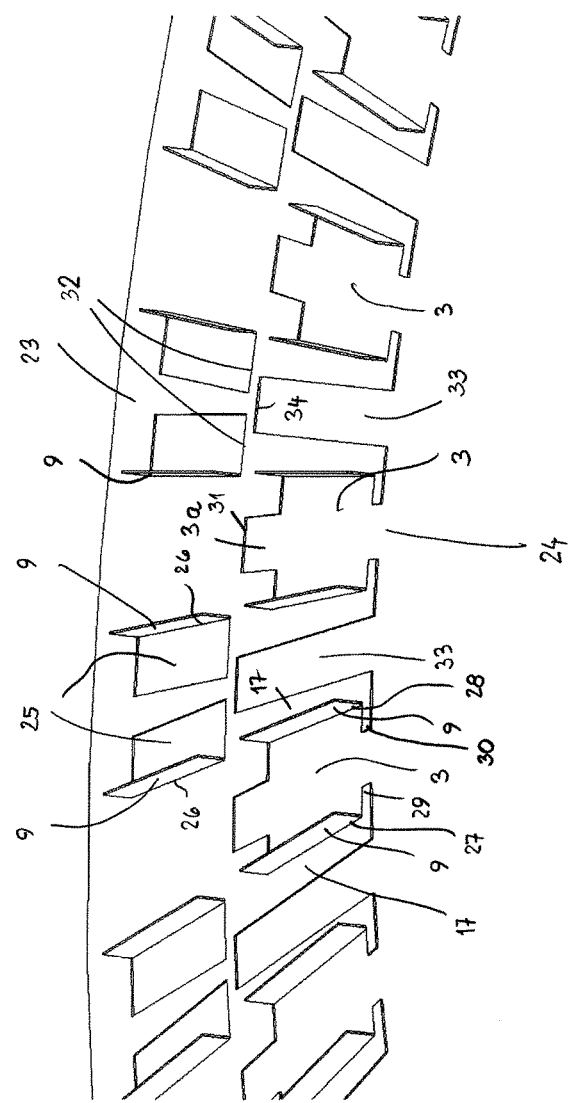

FIGS. 13 to 15 show a stator lamination sheet 14 with two bending rows 23, 24 that lie coaxial to one another and respectively feature the upright lamination sections 9. The outer bending row 23 respectively features two recesses 25 that lie adjacent to one another in the circumferential direction and are spaced apart by a short distance, wherein these recesses have a rectangular contour in the exemplary embodiment. The longitudinal center plane of these recesses 25 respectively lies radially. A lamination section 9 that is perpendicularly bent out of the plane of the stator lamination sheet 14 is respectively situated on the radially extending longitudinal sides 26 of the recesses 25 that face away from one another and extends over the entire length of these longitudinal sides 26. The height of the lamination sections 9 depends on the design of the stator and/or the installation conditions.

The recesses 25 are provided in pairs, wherein the circumferentially measured distance between the recesses 25 of a pair is smaller than the circumferential distance between adjacently arranged pairs of recesses 25. The recesses 25 advantageously have identical dimensions.

The inner bending row 24 likewise features the upright lamination sections 9 that respectively lie in the same radially extending plane as the lamination sections 9 of the outer bending row 23. In this case, the lamination sections 9 lying in the same plane are arranged a short radial distance behind one another. The lamination sections 9 of the inner bending row 24 are provided on the radially extending longitudinal sides 27, 28 of the recesses 3 that face away from one another. The recesses 3 are open radially inward as in the preceding exemplary embodiment. In contrast to the preceding exemplary embodiment, the recesses 3 are partially closed radially inward by narrow tabs 29, 30 that extend in the circumferential direction and are directed against one another.

The smaller recess 3a is arranged in the region that lies radially opposite of the tabs 29, 30, wherein this smaller recess has a rectangular contour and is arranged symmetric to the recess 3. Viewed in the radial direction, the recess 3a lies centrally between the upright lamination sections 9 of adjacent pairs of recesses 25 of the outer bending row 23 (FIG. 15). Viewed in the circumferential direction of the stator lamination sheet 14, the circumferentially extending edge 31 that defines the recess 3a is radially spaced apart from the radially inner narrow sides 32 of the recesses 25.

Additional recesses 33 are situated between adjacent recesses 3, wherein these additional recesses respectively have a rectangular contour and their longitudinal center plans lie in axial planes of the stator lamination sheet 14. The recesses 33 are open radially inward. An edge 34 that is spaced apart from the narrow sides 32 of the pair of recesses 25 of the outer bending row 23 by a short radial distance defines the additional recesses radially outward. The recesses 33 have a constant width in the radial direction. Relative to the radial direction, the recess 33 lies centrally between the corresponding radially outer pairs of recesses 25. Furthermore, the recesses 33 are arranged centrally relative to circumferentially adjacent recesses 3. The radially extending webs 17, which define the recesses 3 in the circumferential direction and are perpendicularly connected to the tabs 29, 30 on their free ends, also define the recesses 33 in the circumferential direction.

The bent-up lamination sections 9 once again form the spacers that define the height of the ventilation channels 19 within the laminated core 20. Since the lamination sections 9 of the recesses 25 and the recesses 3 are respectively aligned behind one another in the radial direction, the individual laminated core sections 22 separated by the ventilation channels 19 are flawlessly supported. The lamination sections 9 can be easily bent out of the lamination sheet in the described fashion. As in the preceding embodiment, it is not necessary to fix the spacers for forming the ventilation channels on the respective lamination sheet. In this way, the elaborate steps required in the prior art for connecting the spacers to the respective lamination sheet are eliminated. In the exemplary embodiment according to FIGS. 13 to 15, the lamination sections 9 are respectively arranged in a U-shaped fashion in both bending rows 23, 24. The lamination sections 9 are arranged symmetrically in both bending rows 23, 24.

Figure 16:
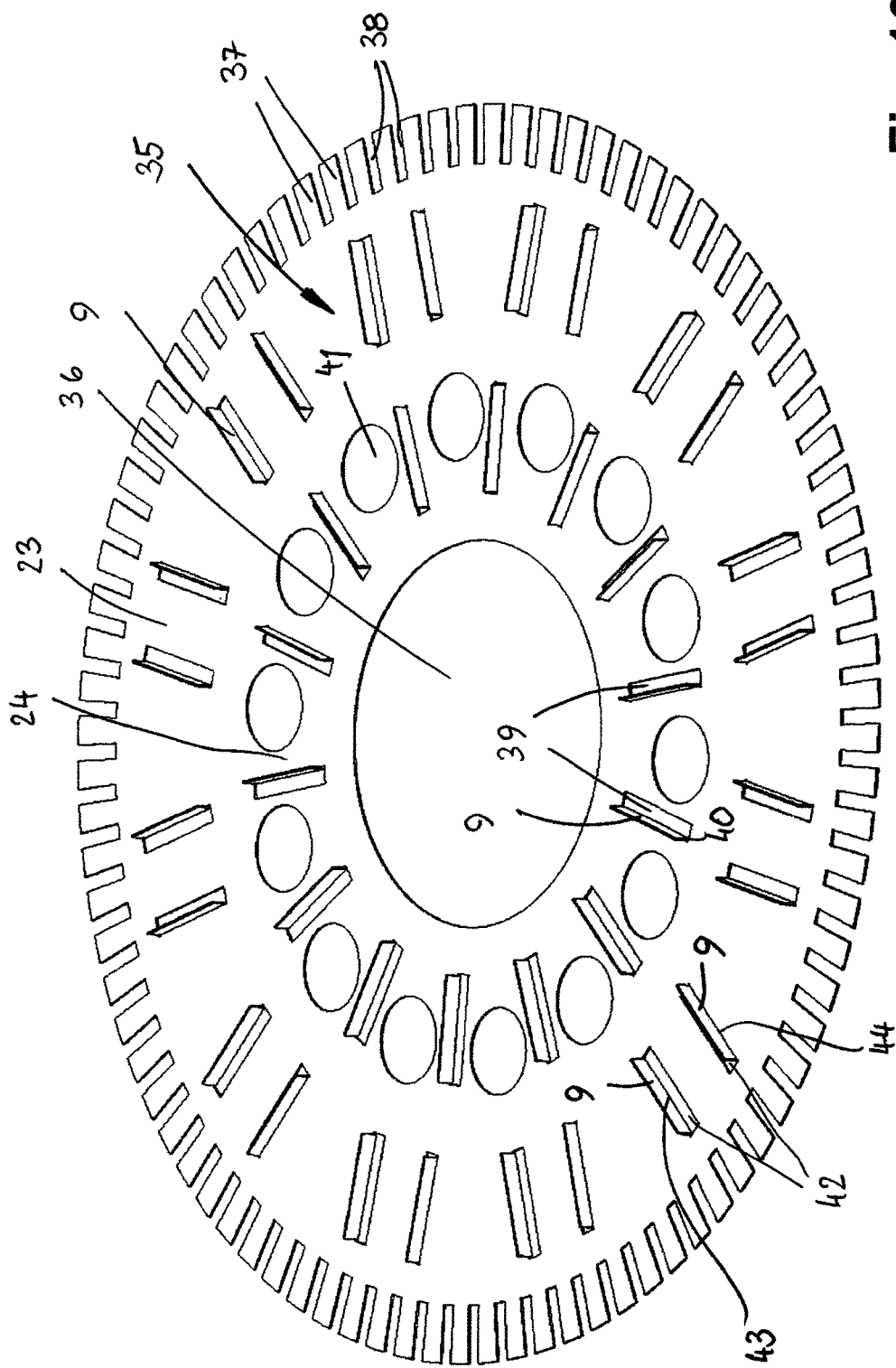

FIG. 16 shows a rotor lamination sheet 35 that is realized annularly and features a central circular opening 36. On the outer edge, the rotor lamination sheet 35 is provided with teeth 37 that extend radially outward and are arranged at identical distances from one another in the circumferential direction of the rotor lamination sheet 35. The teeth 37 have a rectangular contour and circumferentially define rectangular grooves 38 lying between the teeth. Their width is smaller than the width of the teeth 37.

The bent-up lamination sections 9 are situated in the region between the central opening 36 and the circumferential teeth 37 and arranged in two bending rows 23 and 24 as in the preceding exemplary embodiment. The two bending rows 23 and 24 lie coaxial to one another, as well as to the opening 36. The inner bending row 24 features radially extending rectangular recesses 39, the longitudinal axes of which respectively extend radially. The perpendicularly bent-up lamination section 9 is situated on its longitudinal edge 40. The length of the lamination sections 9 corresponds to the length of the longitudinal edge 40. The recesses 39 are spaced apart from the edge of the central opening 36. The bent-up lamination sections 9 are situated on the same longitudinal edge 40 of each recess 39. At least one circular recess 41, the diameter of which is smaller than the length of the longitudinal edge 40 of the recesses 39, is respectively provided between the recesses 39. The recesses 41 advantageously lie at half the width between adjacent recesses 39. In this way, the recesses 41 are offset relative to the recesses 39 in the radial direction such that the recesses 41 radially extend slightly beyond the recesses 39 in the direction of the outer bending row 23.

The outer bending row 23 features rectangular recesses 42 that are respectively arranged in pairs over the circumference of the rotor lamination sheet 35. The lamination sections 9 are perpendicularly bent on the longitudinal edges 44 of the two recesses 42 of a pair that face away from one another. This results in a U-shaped arrangement of the lamination sections 9 relative to the two recesses 42 of each pair of recesses. The longitudinal axes of the recesses 42 extend at an acute angle to one another, as well as an acute angle to the corresponding radial of the rotor lamination sheet 35. The distance between the lamination sections 9 of each pair of recesses is smaller than the distance between circumferentially adjacent pairs of recesses. Analogous to the lamination sections 9 of the recesses 39, the lamination sections 9 of the recesses 42 have the same length as the corresponding longitudinal edge 43, 44 of the recesses 42.

The lamination sections 9 of the two bending rows 23, 24 are radially spaced apart from one another. The lamination sections 9 and therefore the recesses 42 of the outer bending row 23 are also spaced apart from the circumferential teeth 37 and grooves 38 of the rotor lamination sheet 35.

Such a design of the rotor lamination sheet 35 makes it possible to easily realize the ventilation channels at the desired locations within the laminated rotor core in order to ensure a radial ventilation of the laminated rotor core. The individual ventilation channels are distributed over the circumference of the laminated rotor core such that the heat generated during the operation of the respective electric motor or generator can be optimally dissipated from the laminated rotor core.

Figure 17:
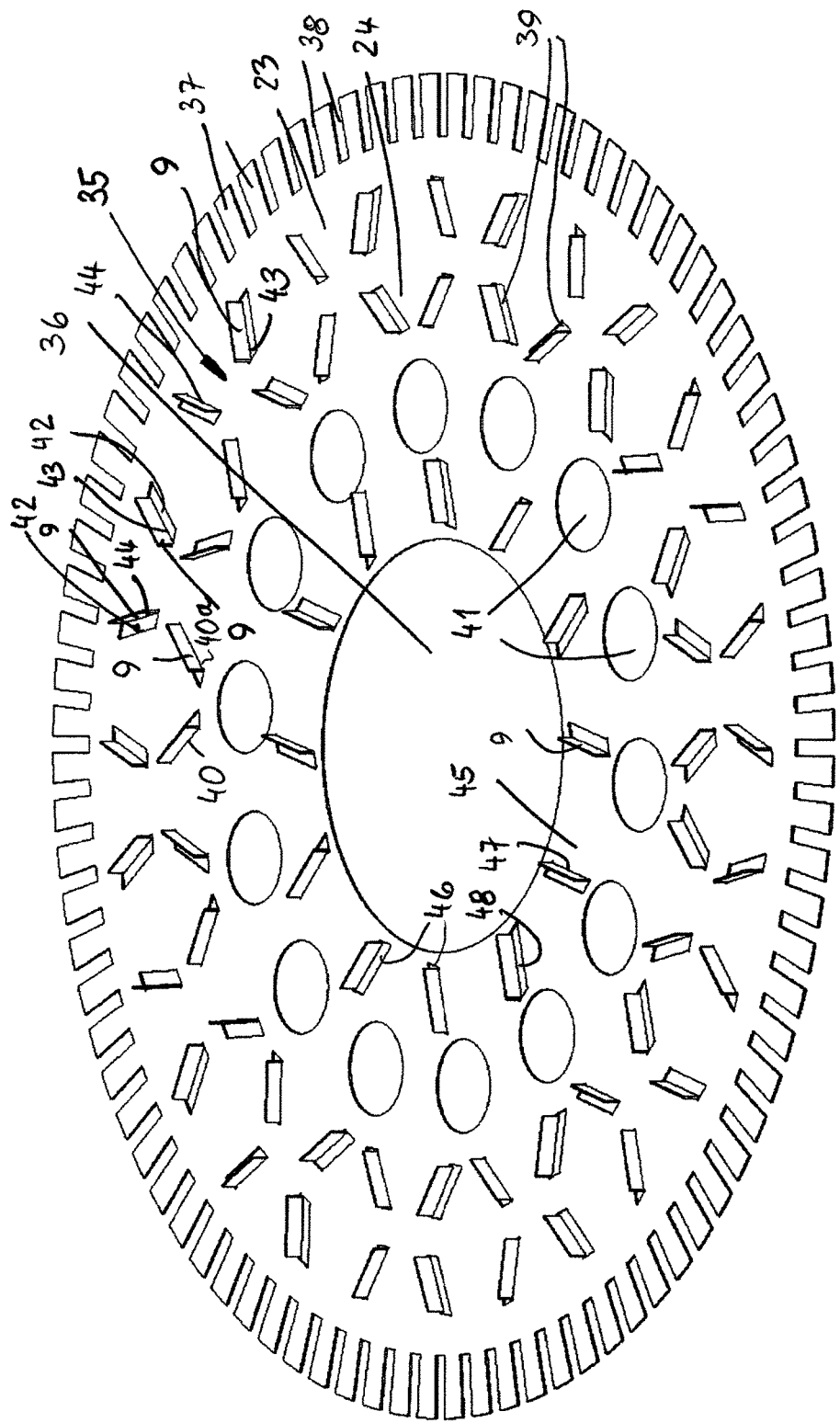

FIG. 17 shows another exemplary embodiment of an annular rotor lamination sheet 35, in which the bent-up lamination sections 9 are arranged in three bending rows 23, 24, 45 that lie coaxial to one another, as well as to the central opening 36. This additional exemplary embodiment is intended to demonstrate that the manufacturer of the corresponding laminated cores has complete freedom in designing the individual lamination sheets so as to ensure optimal heat dissipation with respect to the design of the respective laminated core and/or the operating conditions of the electric motor.

The outer bending row 23 features the rectangular recesses 42, on one longitudinal edge 43, 44 of which a lamination section 9 respectively is perpendicularly bent. The recesses 42 are arranged at identical distances from one another along the circumference of the rotor lamination sheet 35. In this case, the lamination sections 9 are alternately provided on one longitudinal edge and on the other longitudinal edge 43, 44 of the recesses 42. Adjacent recesses 42 respectively extend at an acute angle to one another, wherein the recesses 42 are alternately arranged in a converging and a diverging fashion in the circumferential direction of the rotor lamination sheet 35. All recesses 42 are realized identically and respectively spaced apart from the circumferential teeth 37 and grooves 38, as well as from the central bending row 24. The lamination sections 9 of the outer bending row 23 are respectively arranged in a U-shaped fashion relative to one another and have the same length as the corresponding longitudinal edge 43, 44 of the recesses 42.

The recesses 39 of the central bending row 24 are also realized rectangularly, wherein adjacent recesses 39 are alternately arranged in a converging and a diverging fashion. In this case, the recesses 39 are arranged relative to the recesses 42 of the outer bending row 23 in such a way that recesses 39 extending in a converging fashion in the direction of the opening 36 are assigned to recesses 42 of the outer bending row 23 that extend in a diverging fashion in the direction of the opening 36.

The lamination sections 9 of the central bending row 24 are alternately arranged on the two longitudinal edges 40, 40a of the recesses 39 in the circumferential direction. The bent sections 9 have the same length as the longitudinal edges 40, 40a of the recesses 39. In the exemplary embodiment shown, the recesses 39 and 42 advantageously have the same length. However, the recesses 39, 42 and/or the lamination sections 9 of the two bending rows 23, 24 may, in principle, also have a different length.

The circular recesses 41 uniformly distributed over the circumference of the rotor lamination sheet 35 are situated in the region between the central bending row 24 and the inner bending row 45. Analogous to the recesses 41 in the embodiment according to FIG. 16, they serve for accommodating connecting bolts or as so-called ventilation holes.

The inner bending row 45 features the rectangular recesses 46 that are uniformly distributed over the circumference of the rotor lamination sheet 35. Similar to the lamination sections 9 of the bending rows 23, 24, the lamination sections 9 are arranged in a U-shaped fashion in that they alternately protrude from one longitudinal edge and from the other longitudinal edge of the recesses 46. The bent sections 9 have the same length as the corresponding longitudinal edges 47, 48 of the recesses that are radially spaced apart from the central opening 36, as well as from the recesses 41. The recesses 46 and the corresponding lamination sections 9 are alternately arranged in the circumferential direction such that adjacent recesses 46 alternately converge and diverge relative to one another.

Since the lamination sections 9 extend in a diverging and converging fashion, the resulting effective width of the lamination sections 9 viewed in the radial direction is significantly larger than the thickness of the lamination sections 9. The laminated core sections 22 lying on the lamination sections therefore are optimally supported within the laminated core 20.

Figure 18:
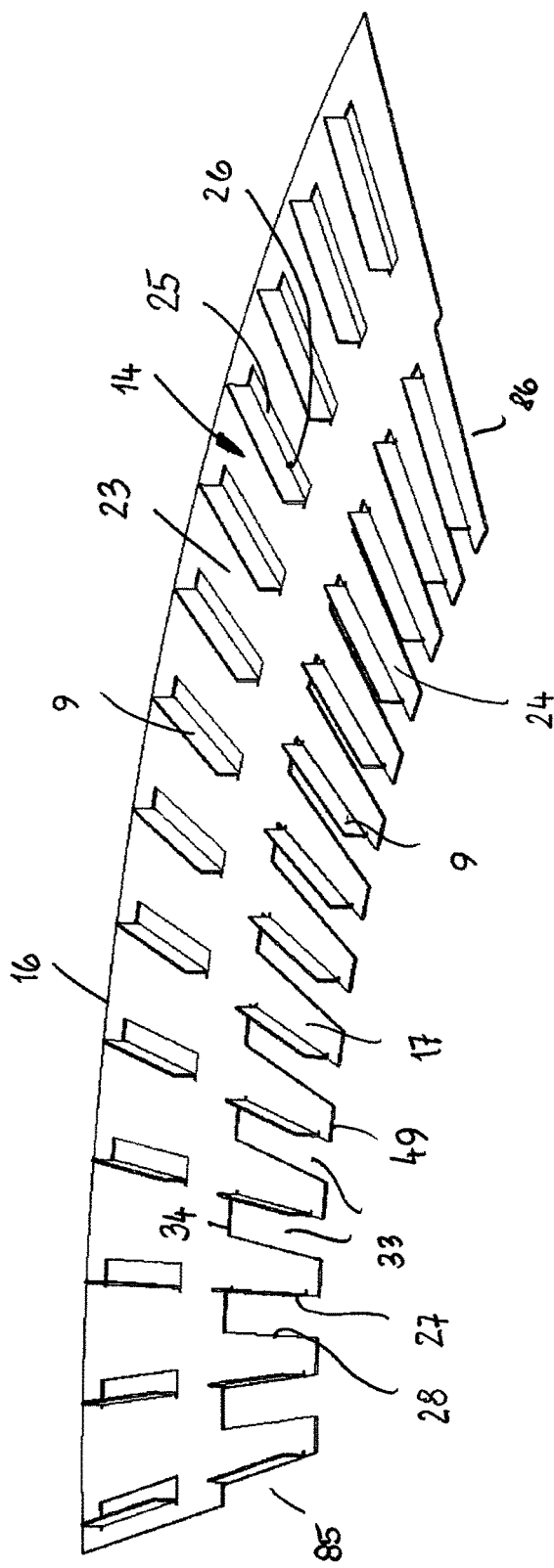
Figure 19:
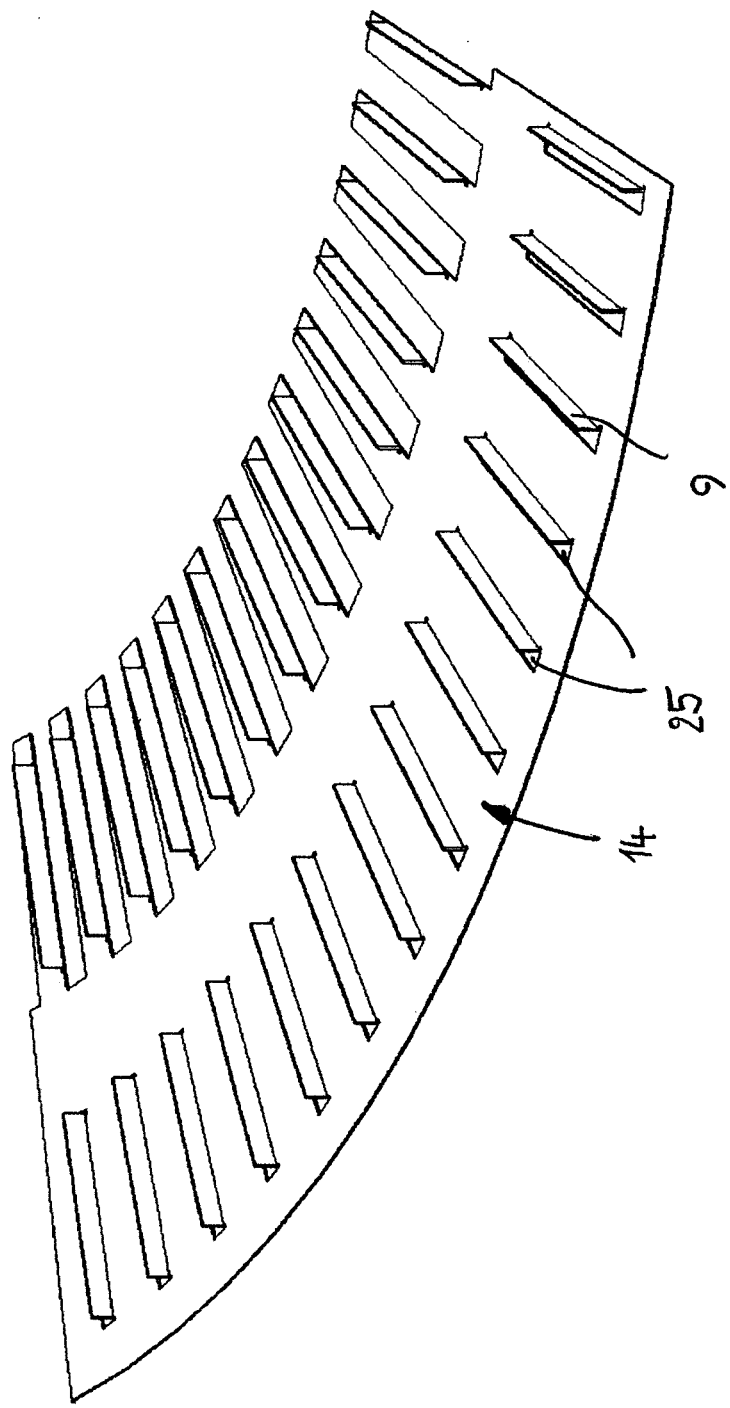

FIGS. 18 and 19 show a stator lamination sheet 14 that is realized in the form of a ring segment and in which the lamination sections 9 are arranged in two bending rows 23, 24 that lie coaxial to one another. The outer bending row 23 features the rectangular recesses 25 that are uniformly distributed in the circumferential direction and the longitudinal axes of which respectively extend radially. The lamination sections 9 are respectively arranged on the same longitudinal side 26 of the recesses 25. The lamination sections 9 have the same length as the longitudinal sides 26. The recesses 25 are radially spaced apart from the outer edge 16 of the stator lamination sheet 14, as well as from the inner bending row 24.

The radially inner bending row 24 features the webs 17 that are equidistantly distributed over the circumference of the stator lamination sheet 14; its circumferentially measured width decreases radially inward. The webs 17 are separated from one another by the recesses 33 that are open radially inward. The recesses 33 are defined by the opposite longitudinal sides 27, 28 of adjacent webs 17. The lamination sections 9 perpendicularly bent out of the stator lamination sheet 14 are arranged on the longitudinal sides 27 of each web 17. Analogous to the exemplary embodiment according to FIGS. 13 to 15, the longitudinal sides 27, 28 of adjacent webs 17 are connected to one another by the edge 34. The front sides 49 of the webs 17 lie on a circle around the axis of the stator lamination sheet 14. The webs 17 are respectively realized identically. The recesses 33 also have an identical shape.

The lamination sections 9 of the two bending rows 23, 24 respectively lie on the same radial of the stator lamination sheet 14. In contrast to the lamination sections 9 of the outer bending row 23, the lamination sections 9 of the inner bending row 24 are shorter than the corresponding longitudinal side 27 of the webs 17. The lamination sections 9 of the inner bending row 24 are spaced apart from the front side 49 of the webs 17, as well as from the edges 34 of the recesses 33.

The edges 34 of the recesses 33 are radially spaced apart from the recesses 25 of the outer bending row 23. Since the lamination sections 9 of the two bending rows 23, 24 respectively lie on the same radial, the ventilation channels 19 are produced in such a way that the laminated core sections 22 lying on top of one another within the laminated core 20 are reliably supported relative to one another. The lamination sections 9 of the two bending rows 23, 24 form ventilation channels 19 that radially extend over the radial width of the stator lamination sheet 14 and only are partially separated from one another in the circumferential direction by the narrow lamination sections 9. Good heat dissipation is therefore ensured during the operation of the stator.

The stator laminations 14 with the shape of ring segments are conventionally assembled into annular stator laminations. The stator lamination sheets 14 are realized in such a way that they respectively feature an inwardly directed shoulder 85, 86 situated at the height of the inner bending row 24 on both of their ends. It is arranged at half the width of the corresponding recesses 33 such that a uniform distribution of the recesses 33 over the circumference is achieved during the assembly of the lamination segments 14.

Figure 20:
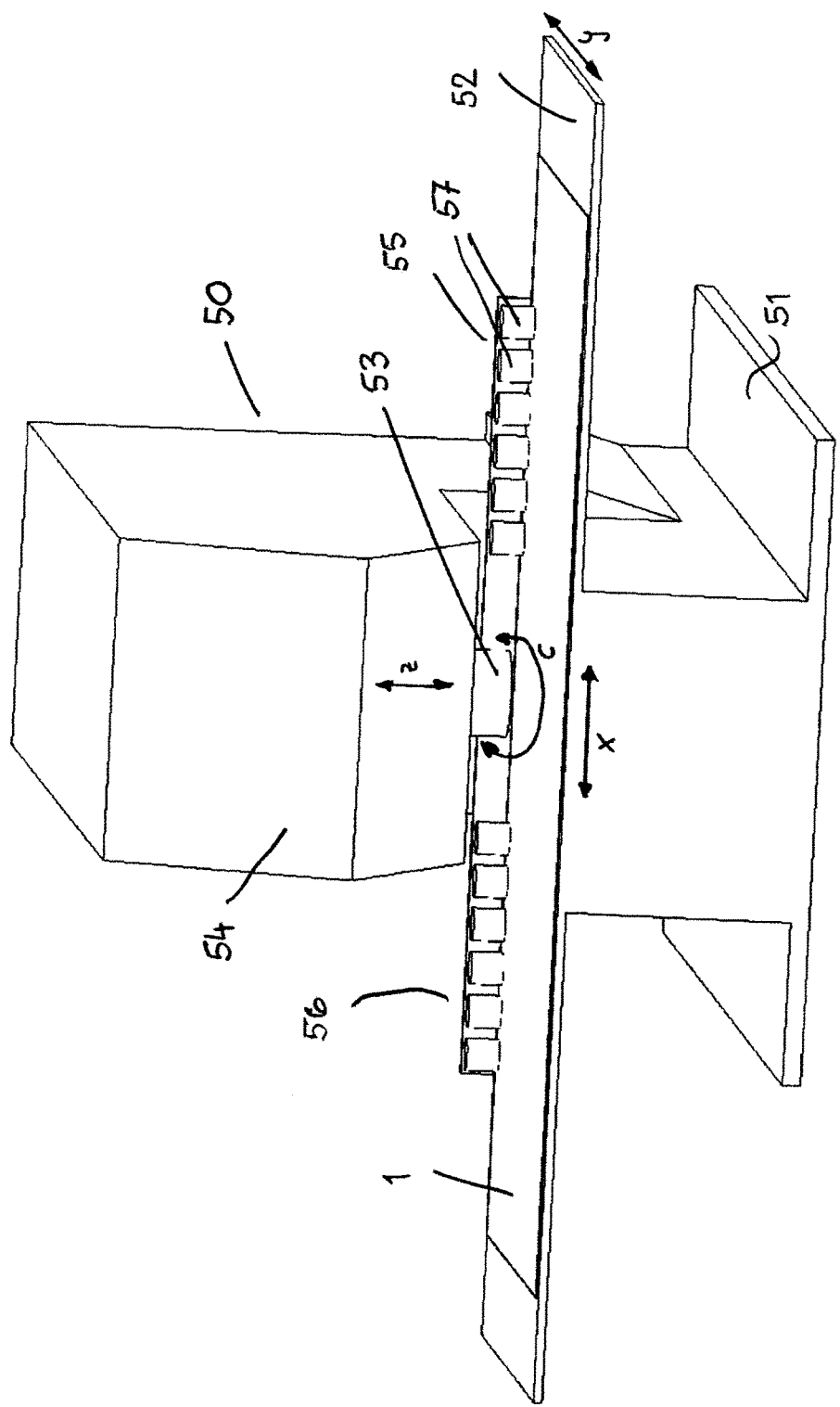
Figure 21:
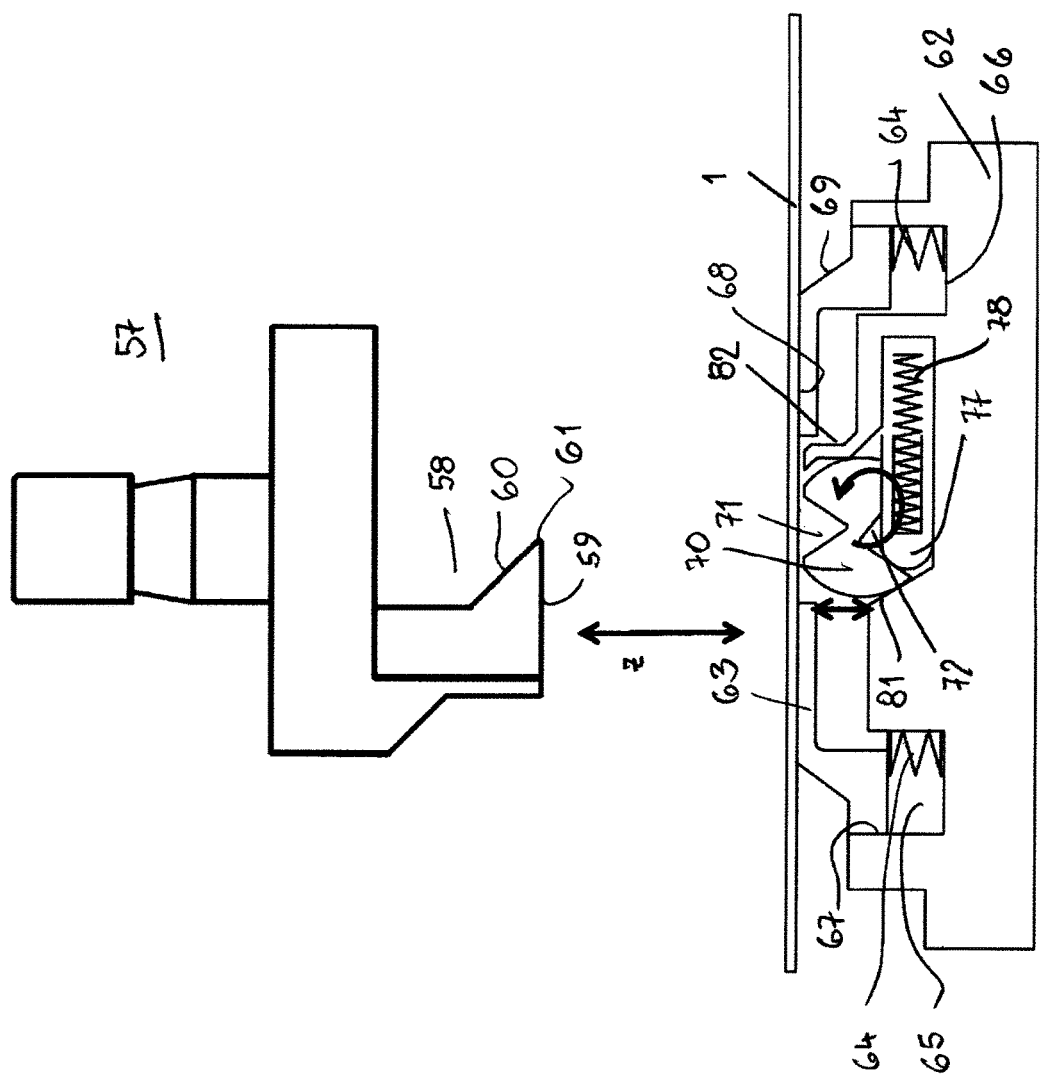
Figure 22:
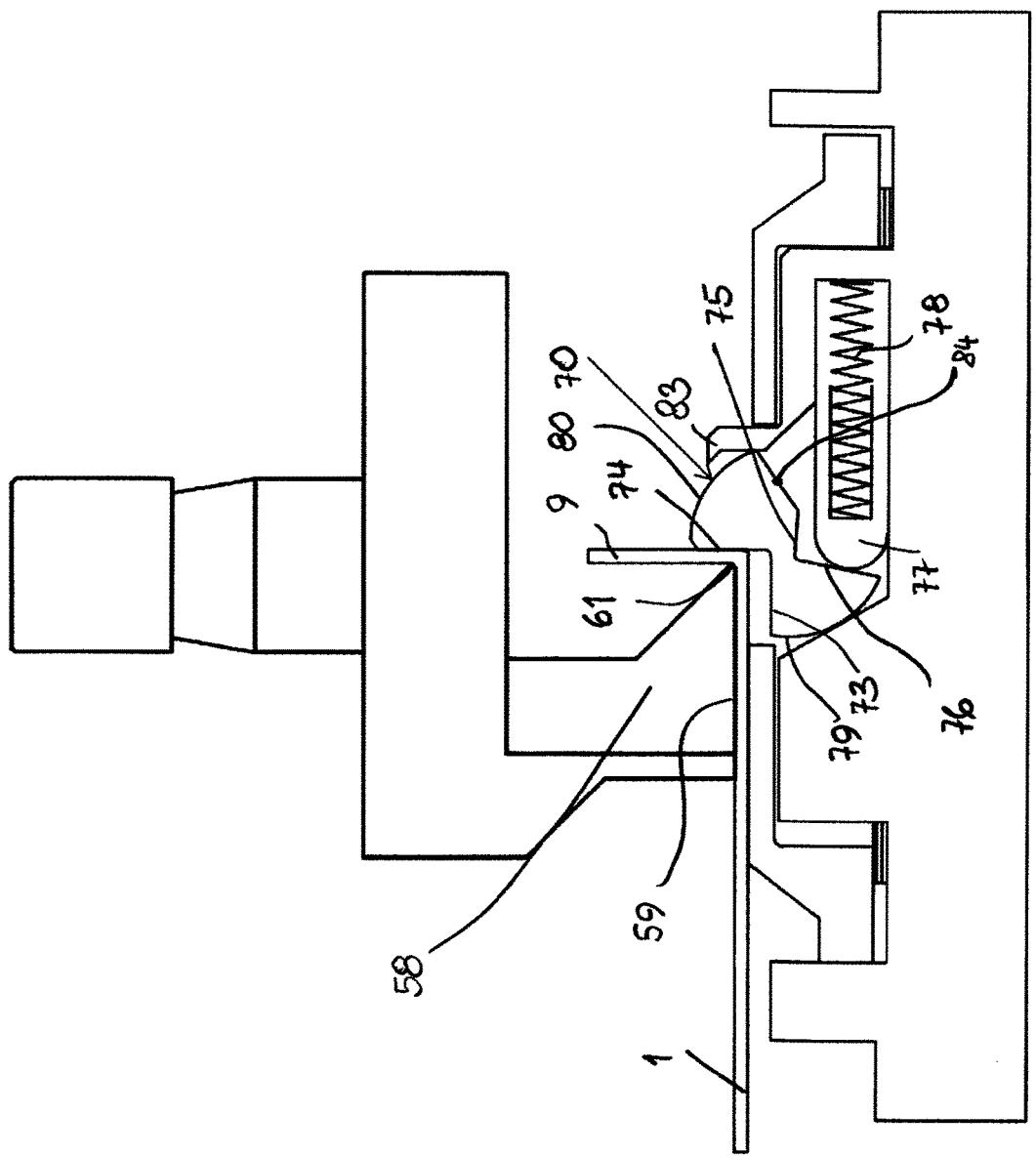

FIGS. 20 to 22 show an exemplary device, by means of which the described lamination parts can be easily and cost-efficiently manufactured.

The device features a machine table 52, on which a metal sheet 1 is arranged. The machine table 52 is provided with a lower tool part (not-shown) that includes a bottom die situated underneath the metal sheet 1. The device is furthermore provided with an upper tool part 53 that includes a punch. The upper tool part 53 can be moved in the direction of the z-axis, as well as turned about the c-axis. The upper tool part 53 is arranged on an upper machine part 54 that lies a certain distance above and at least partially overlaps the machine table 52.

A tool magazine 55, in which the tools required for processing the metal sheet 1 are stored, is situated along the machine table 52. The tools 57 are only schematically indicated in FIG. 20. They are respectively placed into the tool magazine 55 and removed from the tool magazine 55 at a tool changing station 56. Conventional tool changers can be utilized for exchanging the tools 57. Such tool changers are generally known and therefore do not have to be described in greater detail.

The metal sheet 1 is displaced along the x-axis and the y-axis on the machine table 52. The punch-cuts are produced and the bending processes are carried out with the corresponding tools 57.

FIGS. 21 and 22 show an exemplary design of a tool, by means of which the lamination sections 9 can be bent out of the metal sheet 1. The tool 57 has a bending punch 58 that conventionally features a plane hold-down surface 59, by means of which the bending punch 58 flatly lies on the metal sheet 1 during the bending process (FIG. 22). A front surface 60 is connected to the hold-down surface 59 at an acute angle. The transition 61 between the two surfaces 59, 60 forms a bending edge 61.

A bottom die 62 accommodated in the machine table 52 is situated underneath the metal sheet 1. At least one bar 63 is accommodated in the bottom die 62 and subjected to the force of at least one pressure spring 64. This spring acts upon the bar 63 in the direction of the metal sheet 1. The machine table 52 is provided with an opening, through which the bar 63 protrudes under the force of the pressure spring 64. The bar 63 is accommodated in a depression 65 of the bottom die 62. The pressure spring 64 is braced against the bottom 66 of the depression 65. The bar 63 is guided on the side wall 67 of the depression 65 with its outer edge.

The bar 63 has a plane support surface 68, on which the metal sheet 1 lies during the bending process. An outer side 69 is connected to the support surface 68 at an obtuse angle. It prevents the bar 63 from being completely pushed out through the opening in the machine table 52. The bottom die 62 is provided with a bending roll 70 that is rotatable about a horizontal axis. The bending roll 70 features two depressions 71, 72 that lie approximately diametrically opposite of one another and the walls 73, 74 and 75, 76 of which extend perpendicular to one another in the exemplary embodiment (FIG. 22). The bending roll 70 has such a length in the direction of its rotational axis that the lamination sections 9 on the metal sheet 1 can be bent in various lengths.

At least one ram 77 protrudes into the depression 72 and adjoins the wall 76 of the depression 72 under the force of at least one pressure spring 78.

The bending roll 70 is provided with outer sides 79, 80 that are curved in a radial section between the two depressions 71, 72. The bending roll 70 lies on an oblique support surface 81 of the bottom die 62, as well as on a support element 82 that has hook-shaped cross section, with the outer sides 79, 80.

In the initial position according to FIG. 21, the bar 63 protrudes from the opening of the machine table 52 under the force of the pressure spring 64. The metal sheet 1 to be processed is placed on the support surface 68 of the bar 63 during its advance in the x-direction and the y-direction. In this position, the bending roll 70 and the support element 82 are spaced apart from the metal sheet 1. The bending punch 58 is moved toward the metal sheet 1 in the z-direction in order to carry out the bending process. In this case, the metal sheet 1 is downwardly displaced toward the bottom die 62 in the z-direction as soon as it contacts the hold-down surface 59 of the bending punch 48. The bar 63 is pressed downward against the force of the pressure spring 64. The free end of the support element 82 features an ejection tab 83 that protrudes over the bar 63 in its pressed-down position (FIG. 22). When the metal sheet 1 is pressed down, the ejection tab 83 reaches the region of the lamination section 9 to be bent up. Since the metal sheet 1 is partially cut in the described fashion in order to form the lamination section 9, the ejection tab 83 ensures that this partially punched-out lamination region is bent up when the metal sheet 1 is pressed down.

The depression 71 of the bending roll 70 is in the initial position according to FIG. 21 arranged relative to the metal sheet 1 in such a way that the side walls 73, 74 of the depression 71 extend angular to the underside of the metal sheet. The bending roll 70 and the bar 63 are arranged relative to one another in such a way that the bar 63 comes in contact with the curved outer side 79 when it is pressed down. Consequently, the bending roll 70 is turned counterclockwise when the bar 63 is pressed down. The lowering motion of the bar 63 and the turning motion of the bending roll 70 are adapted to one another in such a way that the partially punched-out lamination section of the metal sheet 1 is positioned in the depression 71. The wall 74 of the depression 71 is placed against the partially punched-out lamination section and bends it out of the plane of the metal sheet (FIG. 22). The lamination section 9 needs to be slightly overbent, for example, by 2° because the bent-up lamination section 9 slightly springs back after it is released from the bending roll 70. The overbending of the lamination section 9 ensures that it perpendicularly protrudes from the plane of the metal sheet after the bending process.

When the metal sheet 1 is pressed down by the bending punch 58, the ejection tab 83 of the support element 82 contacts the underside of the partially punched-out lamination section first and therefore already bends this lamination section partially out of the plane of the metal sheet. In this way, the process of completely bending out the lamination section 9 by means of the bending roll 70 is simplified. The lamination section 9 is reliably bent on the bending edge 61 of the bending punch 58. The ejection tab 83 is spaced apart from the curved outer side 80 of the bending roll 70 by a sufficient distance such that it can be turned in an obstruction-free fashion.

Once the bending process is completed, the bending punch 58 is raised in the z-direction. This causes the metal sheet to be released such that the bar 63 subjected to the force of the pressure spring 64 is raised. The bending roll 70 is subjected to the force of the pressure spring 78 that acts upon the bending roll 70 in the clockwise direction via the ram 77. During the retraction of the bending punch 58, the ram 77 ensures that the bending roll 70 is turned from the working position according to FIG. 22 back into the idle position according to FIG. 21. The idle position is advantageously ensured with a limit stop that is contacted by the bending roll 70 with a stopping face 84 (FIG. 22).

In the different embodiments of the stator and rotor lamination sheets, the lamination sections 9 are bent out of the plane of the metal sheet 1 in the described fashion. For this purpose, the metal sheet 1 is respectively transported in the x-direction and the y-direction to the required degree. In order to bend out the different lamination sections over the circumference of the rotor/stator laminations, the upper tool part 53 and at least the bending roll 70, but advantageously the entire bottom die 62, is turned about the c-axis.

The bending roll 70 may also be realized in such a way that it is not turned by the bar 63, but rather by an independent drive. This drive is actuated by a control in such a way that the bending roll 70 is turned about its axis to the required degree at the correct time.

The device may also be realized different from the illustrated and described exemplary embodiment. The described exemplary embodiment therefore should not be interpreted in a restrictive sense.

What is claimed is:

1. A stator/rotor lamination sheet for a stator/rotor lamination core of generators and electric motors, the stator/rotor lamination sheet comprising spacers, wherein the spacers are monolithic lamination sections that are bent out of a lamination sheet plane about a bending edge and create corresponding recesses in the lamination sheet, wherein the spacers transversely protrude from the lamination sheet plane, wherein each spacer has a radial extending therethrough and has a length, wherein each spacer extends across the length at an angle relative to the radial, and wherein each spacer is positioned at a slant relative to a circumference of the stator/rotor lamination sheet, wherein each spacer has a free edge pointing away from the stator/rotor lamination sheet, and the free edge is a contact surface configured to support a neighboring lamination sheet of a laminated core section when the stator/rotor lamination sheet is arranged in a stator/rotor lamination core.

2. The stator/rotor lamination sheet according to claim 1, wherein the spacers are uniformly distributed in a circumferential direction of the stator/rotor lamination sheet.

3. The stator/rotor lamination sheet according to claim 1, wherein the spacers are non-uniformly distributed in a circumferential direction of the stator/rotor lamination sheet.

4. The stator/rotor lamination sheet according to claim 1, wherein the bending edges of the spacers that are arranged adjacent to each other in a circumferential direction of the stator/rotor lamination sheet are situated on the same side of the corresponding recess.

5. The stator/rotor lamination sheet according to claim 1, wherein the bending edges of the spacers that are arranged adjacent to each other in a circumferential direction of the stator/rotor lamination sheet are situated on opposite sides of the corresponding recess.

6. The stator/rotor lamination sheet according to claim 1, wherein the spacers are arranged in at least one row that is coaxial to a central opening of the stator/rotor lamination sheet.

7. The stator/rotor lamination sheet according to claim 6, wherein the spacers are arranged in two or more rows that are coaxial to each other.

8. The stator/rotor lamination sheet according to claim 7, wherein at least some of the spacers arranged in the two or more rows are radially aligned with each other.

9. The stator/rotor lamination sheet according to claim 8, wherein at least some of the spacers arranged in the two or more rows are offset to each other in a circumferential direction relative to a radial direction.

10. The stator/rotor lamination sheet according to claim 1, wherein the length of the spacers is the same as a length of an edge of an adjacent one of the recesses.

11. The stator/rotor lamination sheet according to claim 1, wherein the length of the spacers is shorter than a length of an edge of an adjacent one of the recesses.

12. The stator/rotor lamination sheet according to claim 1, wherein the spacers are positioned perpendicular to the lamination sheet plane.

13. A stator/rotor lamination core comprising laminated core sections, the laminated core sections each comprising stator/rotor lamination sheets that are immediately contacting each other and are immediately connected to each other, wherein between two neighboring laminated core sections, respectively, ventilation channels are arranged, wherein the ventilation channels are formed by spacers that are monolithic lamination sections bent out of a lamination sheet plane of a stator/rotor lamination sheet of the first of the two neighboring laminated core sections that is facing the second of the two neighboring laminated core sections, wherein the spacers support the second of the two neighboring laminated core sections.

\* \* \* \* \*